(12) United States Patent
Tanabe et al.

(10) Patent No.: US 9,987,560 B2
(45) Date of Patent: Jun. 5, 2018

(54) INFORMATION PROCESSING APPARATUS, INFORMATION PROCESSING SYSTEM, STORAGE MEDIUM AND INFORMATION PROCESSING METHOD FOR PERFORMING NON-CONTACT COMMUNICATION AND EXECUTING A GAME APPLICATION

(71) Applicant: NINTENDO CO., LTD., Kyoto (JP)

(72) Inventors: Kensuke Tanabe, Kyoto (JP); Risa Tabata, Kyoto (JP); Ayako Moriwaki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 7 days.

(21) Appl. No.: 15/070,113

(22) Filed: Mar. 15, 2016

(65) Prior Publication Data

US 2016/0346697 A1 Dec. 1, 2016

(30) Foreign Application Priority Data

May 29, 2015 (JP) ................. 2015-109377

(51) Int. Cl.
*A63F 9/24* (2006.01)
*A63F 13/70* (2014.01)
*G06N 7/00* (2006.01)
*G06N 5/04* (2006.01)
*A63F 13/00* (2014.01)

(52) U.S. Cl.
CPC .............. *A63F 13/70* (2014.09); *A63F 13/00* (2013.01); *G06N 5/048* (2013.01); *G06N 7/005* (2013.01)

(58) Field of Classification Search
CPC ........ A63F 13/00; A63F 13/02; A63F 13/027; A63F 13/70
See application file for complete search history.

(56) References Cited

U.S. PATENT DOCUMENTS

| 2002/0155893 | A1* | 10/2002 | Swanberg | ............... | G07F 17/32 463/43 |
| 2004/0106457 | A1* | 6/2004 | Shinoda | .................... | G07F 1/06 463/47 |
| 2005/0059483 | A1* | 3/2005 | Borge | .................... | A63F 13/02 463/29 |
| 2009/0197658 | A1* | 8/2009 | Polchin | ................... | A63F 13/02 463/9 |

(Continued)

FOREIGN PATENT DOCUMENTS

JP 2014-171678 9/2014

*Primary Examiner* — Steve Rowland
(74) *Attorney, Agent, or Firm* — Nixon & Vanderhye PC

(57) ABSTRACT

A non-limiting example game apparatus includes a CPU, and the CPU performs non-contact communication with an IC tag that is incorporated in a figure by using a non-contact communication module. During playing a course game, if a player instructs transformation, a player character is transformed into another character after attesting the figure. Furthermore, if the player instructs writing of a score when the course game is finished, the score is written in the IC tag after attesting the figure. Furthermore, if the player instructs to acquire a predetermined item, after attesting the figure, the predetermined item is acquired by using virtual money. As a level is raised, for example, the number of transformable times is increased, and a kind of acquirable predetermined item is increased.

20 Claims, 15 Drawing Sheets

(56) References Cited

U.S. PATENT DOCUMENTS

| | | | |
|---|---|---|---|
| 2011/0098092 A1* | 4/2011 | Reiche, III | A63F 13/02 463/1 |
| 2012/0295703 A1* | 11/2012 | Reiche | A63F 13/235 463/31 |
| 2013/0231191 A1* | 9/2013 | Rodriguez Machado | A63F 13/12 463/42 |
| 2014/0179446 A1* | 6/2014 | Zuniga | A63F 9/24 463/47 |
| 2014/0256430 A1 | 9/2014 | Matsumura | |
| 2015/0258459 A1* | 9/2015 | Scott | A63F 13/00 463/43 |
| 2016/0325180 A1* | 11/2016 | Nelson | A63F 13/355 |

* cited by examiner

FIG. 8(A)

REFERENCE TABLE

| LEVEL | 1 | 2 | 3 | --- |
|---|---|---|---|---|
| JUDGMENT SCORE | --- | ONE HUNDRED THOUSAND | FIVE HUNDRED THOUSAND | --- |
| NUMBER OF TRANSFORMATION/DAY | 1 | 2 | 3 | --- |
| PROBABILITY TABLE | FIRST PROBABILITY TABLE | SECOND PROBABILITY TABLE | THIRD PROBABILITY TABLE | --- |

FIG. 8(B)

SECOND PROBABILITY TABLE

| CLASSIFICATION | SERIES SELECTION PROBABILITY | KIND | ITEM SELECTION PROBABILITY |
|---|---|---|---|
| BASIC SERIES | 60/100 | FIRST ITEM | 1/m |
| | | SECOND ITEM | 1/m |
| | | ⋮ | ⋮ |
| | | m-TH ITEM | 1/m |
| FIRST RARE SERIES | 40/100 | FIRST ITEM | 1/n |
| | | SECOND ITEM | 1/n |
| | | ⋮ | ⋮ |
| | | n-TH ITEM | 1/n |
| SECOND RARE SERIES | 0/100 | FIRST ITEM | 1/p |
| | | SECOND ITEM | 1/p |
| | | ⋮ | ⋮ |
| | | p-TH ITEM | 1/p |
| ⋮ | ⋮ | ⋮ | ⋮ |

INFORMATION PROCESSING APPARATUS, INFORMATION PROCESSING SYSTEM, STORAGE MEDIUM AND INFORMATION PROCESSING METHOD FOR PERFORMING NON-CONTACT COMMUNICATION AND EXECUTING A GAME APPLICATION

CROSS REFERENCE OF RELATED APPLICATION

The disclosures of Japanese Patent Application No. 2015-109377 filed on May 29, 2015 is incorporated herein by reference.

FIELD

This application describes an information processing apparatus, an information processing system, a storage medium and an information processing method, which performs non-contact communication with a memory or storage medium.

SUMMARY

It is a primary object of an embodiment(s) to provide a novel information processing apparatus, an information processing system, a storage medium and an information processing method.

Furthermore, it is another object of the embodiment(s) to provide an information processing apparatus, an information processing system and a storage medium and an information processing method, capable of increasing interest of information processing that performs non-contact communication with a storage medium.

A first embodiment is an information processing apparatus, comprising: a communication module, an execution module, a writing module, a reading module and a decision module. The communication module is configured to perform non-contact communication with a storage medium. The execution module is configured to execute an application. The writing module is configured to write a score according to an execution result of the application that is executed by the execution module in the storage medium by using the communication module. The score is a mark or point gained by executing the application, a level decided according to the mark etc. or both of the mark and level. The reading module is configured to read the score that is written in the storage medium from the storage medium by using the communication module. The decision module is configured to decide predetermined data that is to be referred to during execution of the application according to the score that is read from the storage medium by the reading module. The execution module is configured to execute the application with referring to the predetermined data decided by the decision module.

According to the first embodiment, the score according to the execution result of the application is written in the storage medium, and the application is executed with referring to the predetermined data that is decided according to the score read from the storage medium, and therefore, it is possible to change processing contents in the application according to the score. Therefore, it is possible to improve interest of the information processing that performs non-contact communication with the storage medium.

A second embodiment is according to the first embodiment, wherein the writing module is configured to cumulatively write the score according to the execution result of the application in the storage medium. The decision module is configured to decide the predetermined data that is to be referred to according to a cumulative value of the score.

According to the second embodiment, since the score is cumulatively written in the storage medium, the score can be changed as the application is repeatedly executed, whereby the processing contents in the application can be changed gradually.

A third embodiment is according to the first embodiment, wherein the predetermined data has the degree of substantiality of the contents that is increased as the score becomes high. Therefore, execution contents (execution result) of the application that refers to the predetermined data is affected. The substantiality of the execution contents or/and the execution result also increases, for example.

According to the third embodiment, since the execution contents of the application are affected with increase of the substantiality of the contents of the predetermined data as the score becomes high, it is possible to improve the interest of the user.

A fourth embodiment is according to the first embodiment, wherein the execution module is configured to execute the application with referring to the predetermined data according to a predetermined condition.

According to the fourth embodiment, it is possible to change processing of the application according to the predetermined condition.

A fifth embodiment is according to the first embodiment, wherein the processing of the application with referring to the predetermined data differs dependent on an execution situation of the application.

According to the fifth embodiment, it is possible to improve the interest of the information processing that performs the non-contact communication with the storage medium.

A sixth embodiment is according to the first embodiment, wherein the reading module is configured to read the score from the storage medium at an arbitrary timing during execution of the application. The score is read at a timing according to an instruction by the user, for example.

According to the sixth embodiment, it is possible to change the processing contents of the application according to the score by reading the score at an arbitrary timing.

A seventh embodiment is according to the first embodiment, wherein the reading module is configured to read the score from the storage medium that is registered corresponding to the application executed by the execution module.

According to the seventh embodiment, since the storage medium that is registered corresponding to the application is used, it is possible to execute the application by using a predetermined storage medium.

An eighth embodiment is according to the first embodiment, wherein the application is a game application, and the processing that executes the application with referring to the predetermined data is processing that assists progress of the game when executing the game application.

According to the eighth embodiment, it is possible to assist the progress of the game by using the storage medium.

A ninth embodiment is an information processing system, comprising: a communication module, an execution module, a writing module, a reading module and a decision module. The communication module is configured to perform non-contact communication with a storage medium. The execution module is configured to execute an application. The writing module is configured to write a score according to an execution result of the application that is executed by the execution module in the storage medium by using the communication module. The score is a mark or point gained by executing the application, a level decided according to the mark etc. or both of the mark and level. The reading module is configured to read the score that is written in the storage medium from the storage medium by using the communication module. The decision module is configured to decide predetermined data that is to be referred to during execution of the application according to the score that is read from the storage medium by the reading module. The execution module is configured to execute the application with referring to the predetermined data decided by the decision module.

A tenth embodiment is a non-transitory storage medium storing an information processing program executable by a computer that comprises a communication apparatus performing non-contact communication with a memory, the information processing program causes the computer to function as: an execution module configured to execute an application; a writing module configured to write a score according to an execution result of the application that is executed by the execution module in the memory by using the communication apparatus; a reading module configured to read the score that is written in the memory from the memory by using the communication apparatus; and a decision module configured to decide predetermined data that is to be referred to during execution of the application according to the score that is read from the memory by the reading module, wherein the execution module is configured to execute the application with referring to the predetermined data decided by the decision module.

An eleventh embodiment is an information processing method of a computer that comprises a communication apparatus performing non-contact communication with a storage medium, comprising steps of: (a) executing an application; (b) writing a score according to an execution result of the application that is executed in the step (a) in the storage medium by using the communication apparatus; (c) reading the score that is written in the storage medium from the storage medium by using the communication apparatus; and (d) deciding predetermined data that is to be referred to during execution of the application according to the score that is read from the storage medium in the step (c), wherein the step (a) executes the application with referring to the predetermined data decided in the step (d).

According to ninth to eleventh embodiments, like the first embodiment, it is possible to improve the interest of the information processing that performs non-contact communication with the memory or storage medium.

The above described objects and other objects, features, aspects and advantages of the embodiments will become more apparent from the following detailed description when taken in conjunction with the accompanying drawings.

BRIEF DESCRIPTION OF THE DRAWINGS

FIG. 8(A) is an illustration view showing a non-limiting example reference table showing the number of transformable times and probability table according to a level and FIG. 8(B) is an illustration view showing a non-limiting example illustration second probability table included in the reference table.

DETAILED DESCRIPTION OF NON-LIMITING EXAMPLE EMBODIMENTS

Figure 1:
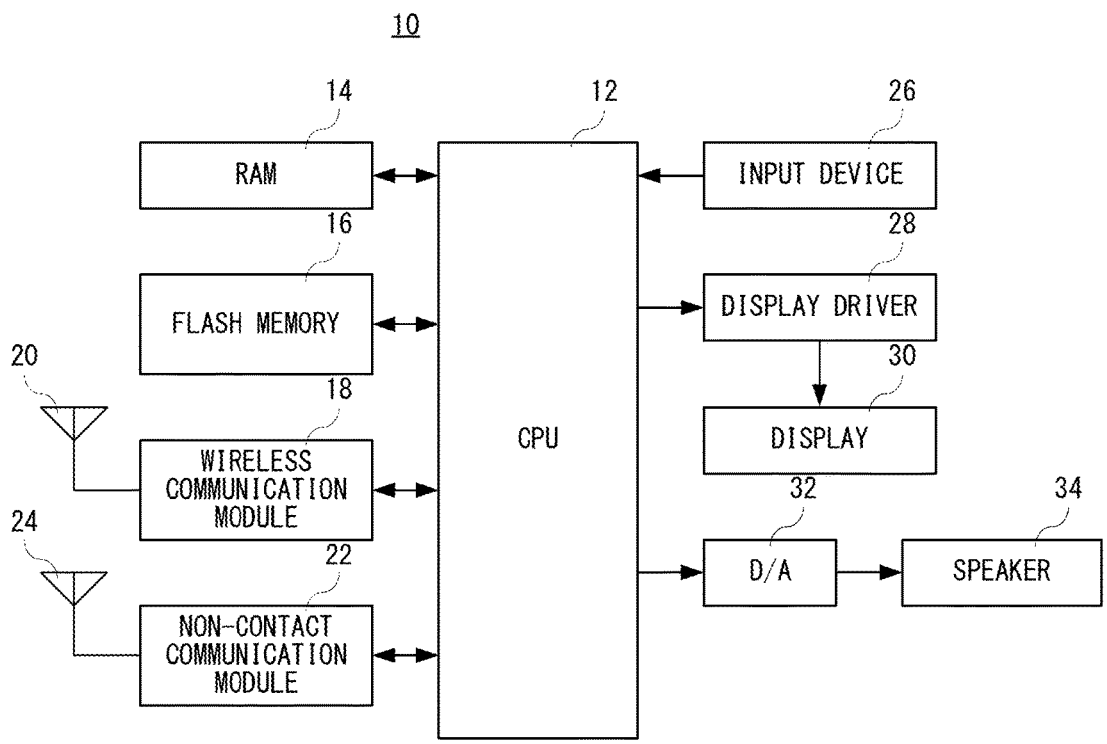
FIG. 1 is a block diagram showing a non-limiting example electric structure of a game apparatus.

With referring to FIG. 1, a non-limiting example game apparatus 10 that is an example of an information processing apparatus includes a CPU 12 that is connected with a RAM14, a flash memory 16, a wireless communication module 18, a non-contact communication module 22, an input device 26, a display driver 28 and a D/A converter 32. Furthermore, an antenna 20 is connected to the wireless communication module 18, and an antenna 24 is connected to the non-contact communication module 22. Furthermore, a display 30 is connected to the display driver 28, and a speaker 34 is connected to the D/A converter 32.

The CPU 12 takes charge of entire control of the game apparatus 10. The RAM14 is used as a working memory and a buffer memory of the CPU 12. The flash memory 16 is used in order to store an application program (information processing program) such as game application and to store (save) various kinds of data. However, there is no necessity that application is limited to a game application, and various kinds of application such as a document production application, an email application, a painting application, a character or letter practice application, a linguistic training application, a study application, etc. correspond to the application.

The wireless communication module 18 has a function linking to a wireless LAN. Therefore, the game apparatus 10 can performs communication with computers and other game apparatuses 10 directly or via a network. That is, the game apparatus 10 can transmit and receive a program and data between other computers or/and other game apparatuses 10. A program and data of the game application, for example can be distributed from other computers. Furthermore, it is possible to play a communication game between other computers or/and other game apparatuses 10.

The non-contact communication module 22 performs non-contact data communication with radio between an IC tag 50 (see FIG. 3) according to the telecommunications standard of ISO/IEC18092 (so called NFC), etc., for example. A communication distance is few or several centimeters to few or several meters. The non-contact communication module 22 transmits to the IC tag 50 a signal (read instruction) that instructs read-out of data that is stored, and receives desired data as a response to this. That is, the non-contact communication module 22 functions as a reader of the IC tag 50. Furthermore, the non-contact communication module 22 can make the IC tag 50 perform writing of data by transmitting a signal (write instruction) that instructs write-in together with the data to be written. That is, the non-contact communication module 22 functions as a writer of the IC tag 50.

In addition, although the non-contact communication module 22 transmits and receives data to or from the IC tags 50 according to the telecommunication standard of NFC in this embodiment, it does not need to be limited to this. In other embodiments, a communication method of the non-contact communication module 22 may be various communication methods adopted as a non-contact communication or a short-distance wireless communication.

Figure 2:
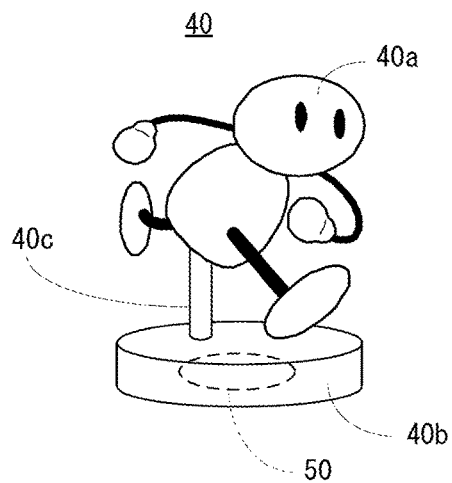
FIG. 2 is an illustration view showing a non-limiting example appearance of a figure that performs non-contact communication with the game apparatus shown in FIG. 1.

As shown in FIG. 2, a predetermined FIG. 40 includes a figure main body 40a imitating a game character, a base 40b and a fixing member 40c for fixing the figure main body 40a to the base 40b. In the example shown in FIG. 2, the figure main body 40a is formed so as to imitate a protagonist character (player character 152) of the game describe later. In addition, when the figure main body 40a can be secured to the base 40b with strength of a certain degree, the fixed member 40c is omitted. As an example, a label sheet type IC tag 50 is used, and this IC tag 50 is fixed (adhered) to an inside of the base 40b. However, a coin type one may be used as the IC tag 50.

Returning to FIG. 1, the input device 26 includes various kinds of operating buttons or/and a touch panel. Therefore, if a user or player (hereinafter, simply called "player") operates the operating button or/and the touch panel, corresponding operation data or/and touch coordinates data is input to the CPU 12. Hereinafter, the operation data or/and the touch coordinates data may be called "operation input data".

The display driver 28 is used in order to display various kinds of screens on the display 30 under instructions of the CPU 12. In addition, the CPU 12 uses a part of the RAM 14 as a video RAM (VRAM) so as to produce image data corresponding to various kinds of screens.

The D/A converter 32 converts sound data applied from the CPU 12 into an analog sound signal, and outputs the same to the speaker 34. In addition, the sound signal is a sound signal corresponding to a sound effect and music (BGM) when the application is executed. When a game application is executed, for example, a sound signal corresponding to an imitation sound that a character or object utters or generates may be output.

Although illustration is omitted, if a card I/F is provided in the game apparatus 10, it is possible to read an application program and data from a card storage medium that is connected via this card I/F in a manner capable of performing communication.

In addition, the electric structure of the game apparatus 10 shown in FIG. 1 is a mere example, and it does not need to be limited to this.

The game apparatus 10 may be provided with at least one of an acceleration sensor and a gyro-sensor, for example. In such a case, it is possible to detect a direction of the game apparatus 10 based on an output of the acceleration sensor or/and gyro-sensor, and change a direction of a screen that is displayed on the display 30 according to the direction of the game apparatus 10. Furthermore, it is also possible to use the output of the acceleration sensor or/and gyro-sensor as instructions (operation input) by the player. For example, a motion of the game apparatus 10 is detected according to the output of the acceleration sensor or/and gyro-sensor according to a direction that the player inclines or/and moves the game apparatus 10, whereby a moving direction of the player character in a virtual space can be changed, or/and a direction of a virtual camera in the virtual space can be also changed.

Furthermore, the game apparatus 10 may be provided with a vibrator. The vibrator is a vibrating motor or solenoid, for example, and provided inside the game apparatus 10, and gives vibration to fingers of the player who holds the game apparatus 10 concerned. By thus providing the vibrator, the game apparatus 10 can generate vibration according to the operation input by using the input device 26, and can also generate vibration according to progress of the application such as a game, for example.

Figure 3:
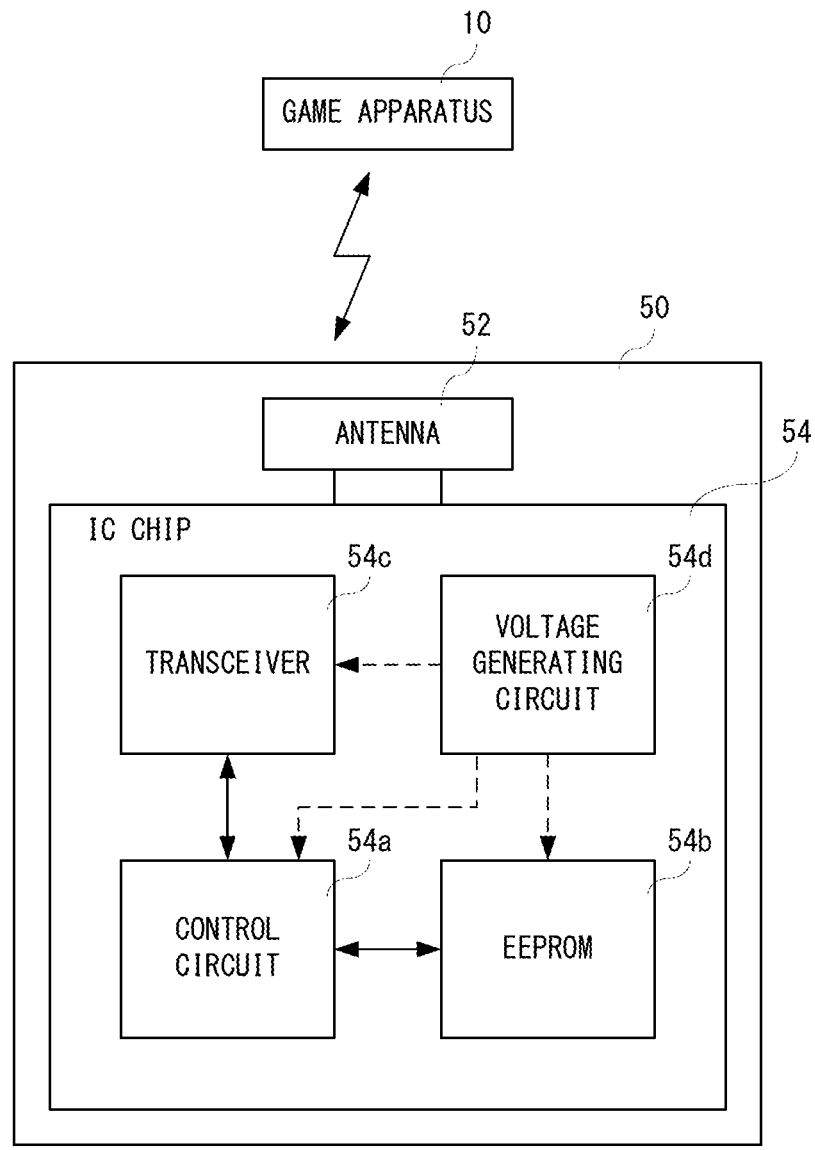
FIG. 3 is a block diagram showing a non-limiting example electric structure of an IC tag that is incorporated in the figure shown in FIG. 2.

FIG. 3 is a block diagram showing an example of electric structure of the IC tag 50 incorporated in the base 40b of the FIG. 40 of FIG. 2. The IC tag 50 is a general-purpose passive type RFID tag, and includes an antenna 52 wound in a shape of a coil, and an IC chip 54 is connected to this antenna 52. The IC chip 54 comprises a control circuit 54a, an EEPROM 54b, a transceiver circuit 54c and a voltage generating circuit 54d. In addition, instead of the EEPROM 54b, other non-volatile memories such as a flash memory may be provided.

The IC tag 50 receives by the antenna 52 a radio wave including a wireless signal from a reader/writer (the non-contact communication module 22 in this embodiment), and when receiving the radio wave, the voltage generating circuit 54d rectifies the received radio wave, and generates (produces) a power supply voltage required for the control circuit 54a, the EEPROM 54b and the transceiver circuit 54c, and supplies the power supply voltage. In FIG. 3, a power supply line that supplies the power supply voltage is shown by a dotted line.

The transceiver circuit 54c demodulates instructions or/and data from the received radio wave to apply to the control circuit 54a. The control circuit 54a receives the demodulated instructions or/and data, and executes processing according to the instructions. If it is a data write instruction, for example, the control circuit 54a writes the data that is received together with the write instruction concerned in the EEPROM 54b.

Furthermore, if the demodulated instruction is a data read instruction, the control circuit 54a reads data from the EEPROM 54b according to the read instruction concerned, and applies the read data to the transceiver circuit 54c. Then, the transceiver circuit 54c modulates the data and transmits from the antenna 52 by a carrier wave. Therefore, the game apparatus 10 receives the radio wave that is transmitted from the IC tag 50 by the non-contact communication module 22 via the antenna 24.

The EEPROM 54b is stored with data of identification information about the FIG. 40 that incorporates this IC tag 50 and predetermined game data about a game application that uses the FIG. 40 concerned, for example.

Here, the identification information includes information (individual information) for identifying a kind of the FIG. 40 and for individually identifying the FIG. 40 in the kind concerned, and information (game information) for identifying a game application that the FIG. 40 is used.

The predetermined game data is, in this embodiment, data about a cumulated value of a score (hereinafter, called "cumulative score") that is gained by executing a game application by using the FIG. 40 concerned. The score is marks (points), for example. However, as the score, a level may be described in place with the marks or points. Otherwise, the marks or points and the level may be described as the score.

Next, a game that can be played when a game application (game program) of this embodiment is executed with such a game apparatus 10 will be described. In this game application, it is possible to play a game in courses prepared in advance. Furthermore, with this game application, a predetermined item can be acquired by using virtual money that is obtained by playing the game in the course, etc. However, in this embodiment, a predetermined item that can be acquired by using the virtual money differs from a predetermined item that can be acquired in the game in the course. Accordingly, in the following, a predetermined item that can be acquired in the game in the course will be called "item inside course", and a predetermined item that can be acquired out of the course by using the virtual money will be called "item outside course." Furthermore, in this game application, it is possible to see an item outside course that is acquired.

The item outside course is a virtual figure about a protagonist character (player character 152), for example. Many kinds of the virtual figures are prepared, and include kinds from a kind (basic series) that is acquirable relatively easily to a rare kind (rare series) that is acquirable rarely. Furthermore, a special kind (special series) of virtual figure that is added ex post to be selectable is also included in the rare kind of virtual figure.

However, the rare series is classified into a plurality of groups (in this embodiment, first rare series, second rare series, - - - ) according to height of acquisition possibility (rarity). Furthermore, the rarity is set also to the virtual figure of the special series, and when added ex post, they are added to classifications according to the rarity that is set.

Figure 4A:
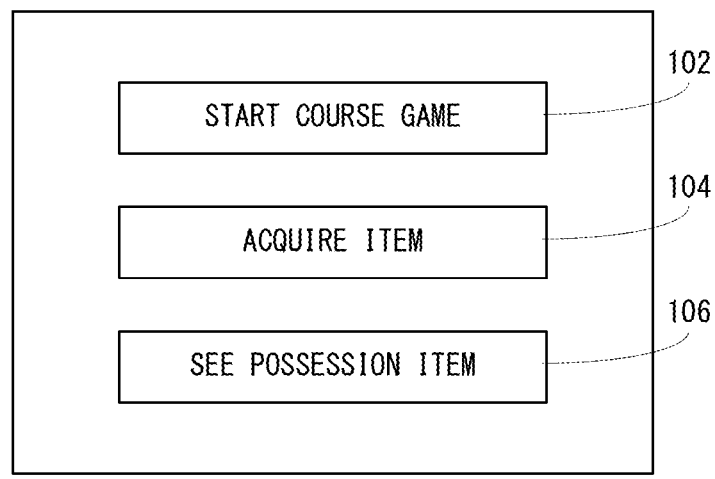
FIG. 4(A) is an illustration view showing a non-limiting example main menu screen that is displayed on a display in FIG. 1

When executing a game application, a main menu screen 100 as shown in FIG. 4(A) is displayed on the display 30. An icon 102, an icon 104 and an icon 106 are displayed in the main menu screen 100. The icon 102 is provided in order to play (start) a game in the course (hereinafter, called "course game"). The icon 104 is provided in order to acquire the item outside course. The icon 106 is provided in order to see (appreciate) the item outside course that is acquired.

In addition, although illustration is omitted, before the main menu screen 100 is displayed, an initial screen is displayed, and it is selected by a player in this initial screen whether the game is to be started at the beginning or halfway. Furthermore, it is possible to also select, in this initial screen, execution of processing for registering the FIG. 40 to be used in this game.

When the execution of the processing for registering (registration processing) the FIG. 40 to be used in this game is selected, as described later, a placement screen 200 for placing the FIG. 40 is displayed on the display 30. If the FIG. 40 is placed on the placement screen 200, the game apparatus 10 reads the identification information (figure kind information, individual information and game information) from the FIG. 40, and determines whether the FIG. 40 concerned is a figure that can be used in the game application. If the FIG. 40 is a figure that cannot be used in this game application, the game apparatus 10 notifies that the figure cannot be registered and terminates the registration processing. On the other hand, if the FIG. 40 is a figure that can be used in this game application, the game apparatus 10 stores the individual information and the game information in the flash memory 16 while being associated with save data of the game application concerned, and notifies that registration is completed, and terminates the registration processing.

In addition, the save data is stored in the flash memory 16 and includes halfway data in progress or result data of the game. In this embodiment, the save data includes level data 504d, possession money data 504e, possession item data 504f and data about a current course each will be described later, and the individual information and the game information are associated with such the save data.

Figure 4B:
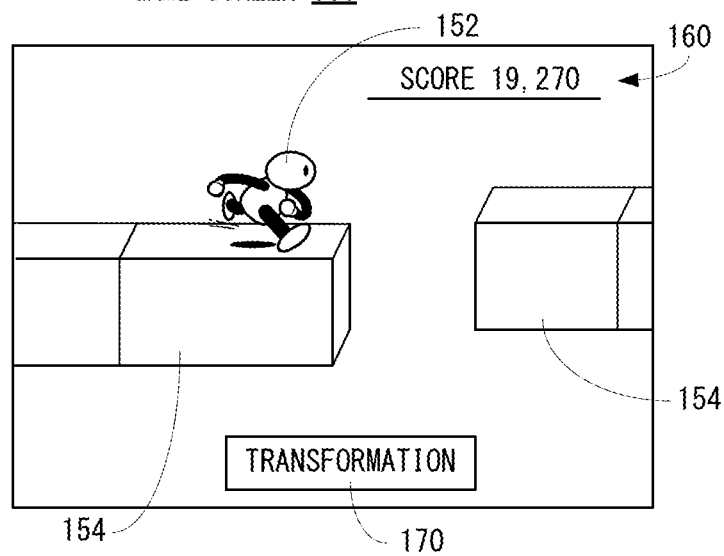
FIG. 4(B) is an illustration view showing a non-limiting example game screen that is displayed on the display in FIG. 1.

FIG. 4(B) shows an example of a game screen 150 that is displayed on the display 30 when playing the course game. In the game screen 150, background objects 154 such as a block object that a player character 152 rides on are displayed while the player character 152 is displayed. Furthermore, a character string 160 indicative of the score gained by the present time in the course concerned is displayed at the upper right of the game screen 150. Furthermore, an icon 170 is displayed at the lower center of the game screen 150. This icon 170 is provided in order to transform or deform (evolve) the player character 152 into other characters. In addition, in this embodiment, the number of times that the player character 152 can be transformed in a day (number of transformable times) is determined according to a level of the player character 152.

For example, another character into which the player character 152 is transformed (hereinafter, transformation character) is a character having an ability higher than that of a normal player character 152, and a movement speed thereof is faster than that of the normal player character 152, and a jumping force, an offensive force and a defense force are all larger than those of the normal player character 152.

In addition, an ability value of the player character 152 is made higher in this embodiment when the player character 152 is transformed into a transformation character, but it does not need to be limited to this. A transformation character may be made into an invincible state, for example.

Figure 5:
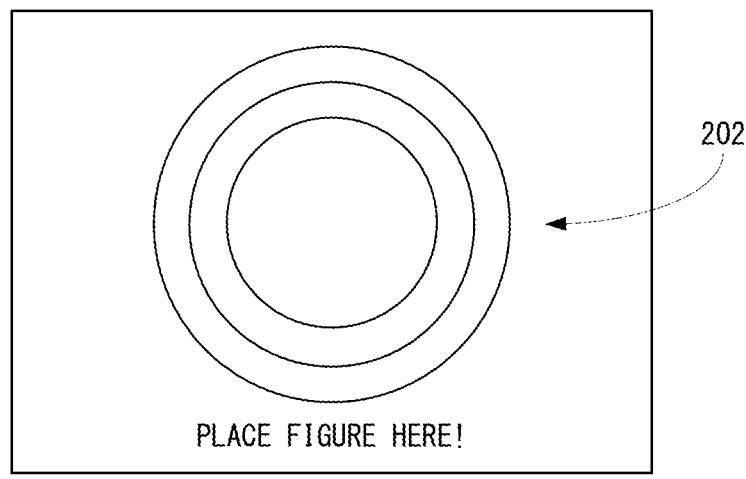
FIG. 5 is an illustration view showing a non-limiting example placement screen that is displayed on the display in FIG. 1.

However, when transforming the player character 152, the FIG. 40 shown in FIG. 2 is used. As described above, if the icon 170 is selected, the placement screen 200 for placing (passing over) the FIG. 40 on the game apparatus 10 is displayed on the display 30 as shown in FIG. 5. The placement screen 200 may be displayed on the display 30 side by side with the game screen 150, or may be displayed on the display 30 in place with the game screen 150. In the following, this can be similarly applied to a case where the placement screen 200 is displayed. However, the processing of the course game is suspended during the placement screen 200 is being displayed, that is, until transformation processing of the player character 152 is completed after the icon 170 is selected.

As shown in FIG. 5, an indication image 202 for indicating to a player a position that the FIG. 40 is to be placed in the placement screen 200, and below the same, a message that the FIG. 40 is to be placed on the placement screen 200 is displayed.

If the player places the FIG. 40 on the placement screen 200 (displaying surface of the display 30), the game apparatus 10 acquires the identification information from the FIG. 40 (IC tag 50). If the FIG. 40 is of the kind that can be used in the game application concerned and registered corresponding to the game application concerned, the player character 152 can be transformed into a transformation character. However, it is limited to a case where the number of transformable times is one (1) or more.

Furthermore, if the FIG. 40 is not a figure of the kind that can be used in the game application concerned, it is notified that a figure other than a right kind of figure cannot be used, and the player character 152 is not transformed into a transformation character. Furthermore, even if it is the right kind of FIG. 40, if it is deferent from the FIG. 40 that is registered, it is notified that the FIG. 40 concerned cannot be used unless registered, and the player character 152 is not transformed into a transformation character.

In the course game, for example, according to an operation by the player, the player character 152 performs movement (running, jumping, flying, etc.) and arbitrary action (holding, taking, stomping, throwing, kicking, etc.), and advances inside the virtual course from a start point, avoids an enemy character or its attack, pushes down an enemy character, or acquires or uses an item inside course. The item inside course is virtual money, weapon, a tool, medicine, food, etc., for example. Then, if the player character 152 reaches at a goal point within a time limit, the course concerned become to be finished (beated). However, if a physical strength gauge becomes 0 (zero) when the player character 152 receives an attack of an enemy character, or the player character 152 comes out of a course, or if it is past a time limit before the player character 152 arrives at a goal point, it becomes mistake and game over.

Figure 6A:
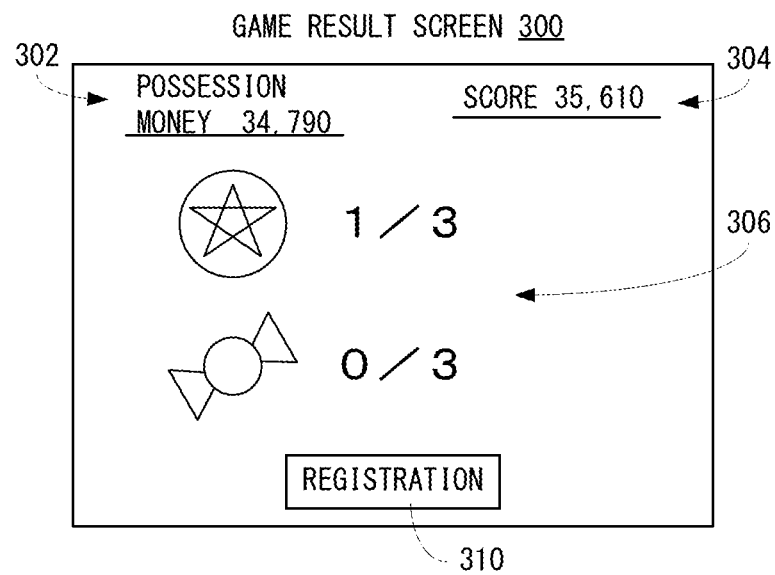
FIG. 6(A) is an illustration view showing a non-limiting example game result screen that is displayed on the display in FIG. 1

In such a course game, if the course is finished, a game result screen 300 as shown in FIG. 6(A) is displayed on the display 30. In this game result screen 300, a character string 302 indicative of the possession money and a character string 304 indicative of the score are displayed in an upper part of the screen. However, the possession money is a total amount of the virtual money that the player character 152 possesses currently. Furthermore, the score is a sum total of the score gained in the course that is finished. Furthermore, images of the special items that are arranged in the course and a character string 306 indicative of the number of acquisition of the special items in total are displayed in the center of the game result screen 300. Furthermore, an icon 310 is displayed at the lower center of the game result screen 300. The icon 310 is provided in order to write the score that is gained this time in the FIG. 40. A case where the icon 310 is selected will be described later.

Figure 6B:
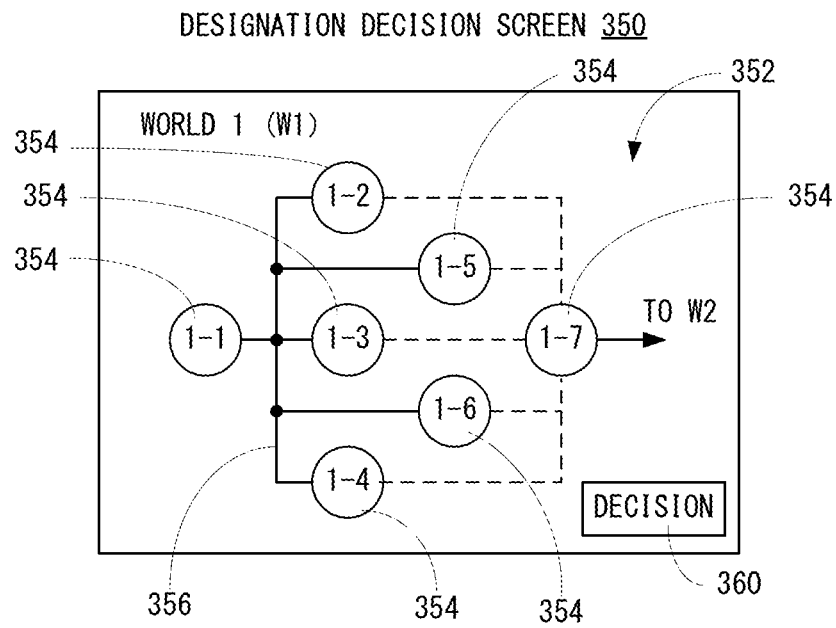
FIG. 6(B) is an illustration view showing a non-limiting example destination decision screen that is displayed on the display in FIG. 1.

Furthermore, if the course is finished, it is possible to advance to a next course, and a next course (course that becomes a destination) is decided (selected) according to instructions by the player. When deciding the next course, a destination decision screen 350 as shown in FIG. 6(B) is displayed on the display 30. If a predetermined operating button is operated (turned-on) without selecting the icon 310 when the game result screen 300 is being displayed, this destination decision screen 350 is displayed on the display 30 after the game result screen 300 is non-displayed. Furthermore, when the icon 310 is selected, after the score gained this time is written into the FIG. 40, this destination decision screen 350 is displayed on the display 30.

A map 352 is displayed in the destination decision screen 350. The map 352 includes a plurality of index images 354 that indicate respective courses, and respective index images 354 are coupled by an image showing a route (route image) 356. However, the map 352 is a part of all courses, and displayed per world. In this embodiment, all the courses are classified into a plurality of worlds (W1, W2, - - - ), and if all the courses are finished in a single world, it is possible to advance to a next world. Furthermore, a first course and a last course are prepared for each world, and a plurality of other courses are prepared between them. However, in a single world, the first course is automatically selected when a course game is started at the beginning, and when the world concerned is played for the first time. Furthermore, in a single world, the last course becomes selectable when all other courses in the world concerned are finished. Furthermore, if an icon 360 is selected, a single course is randomly selected among the courses that are not yet finished in the plurality of other courses between the first course and the last course. That is, the icon 360 is provided in order to instruct decision (selection) of the next course.

When a course game is started at the beginning, for example, a first course 1-1 of a world W1 is selected automatically. After finishing the course 1-1, the destination decision screen 350 as shown in FIG. 6(B), for example is displayed on the display 30. Here, if the player selects the icon 360, a single course (destination course) is selected among the course 1-2 to the course 1-6 at random. The play of the course game and the decision (selection) of the destination course are thus repeated. In addition, the course that is finished once is excluded from a candidate in deciding a destination, but not needed to be excluded. Then, if all the courses other than the last course are finished, a route image 356 to the last course 1-7 is changed into a solid line, and the last course 1-7 becomes selectable as a course of a destination. Here, the player can select whether the last course is to be played or the course other than that is to be played again. If the last course 1-7 is finished, it is possible to advance to a next world.

However, in this embodiment, if a destination course is decided, a screen once returns to the main menu. That is, the main menu screen 100 is displayed on the display 30 in place with the destination decision screen 350. In the following, this can be similarly applied to a case returning to the main menu.

Furthermore, as described above, if the icon 310 is selected in the game result screen 300, processing that writes the score gained this time into the FIG. 40 (IC tag 50) is executed. At this time, the placement screen 200 shown in FIG. 5 is displayed on the display 30.

If the player places the FIG. 40 on the placement screen 200 (displaying surface of the display 30), the game apparatus 10 acquires identification information from the FIG. 40 (IC tag 50). If the FIG. 40 is of the kind that can be used in the game application concerned and registered corresponding to the game application concerned, the score gained this time is written in the IC tag 50 incorporated in the FIG. 40. That is, the score gained this time is added to the cumulative score, and the cumulative score is updated. Specifically describing, if the FIG. 40 is a figure of the kind that can be used in the game application concerned and registered corresponding to the game application concerned, the game apparatus 10 reads the cumulative score from the FIG. 40 (IC tag 50). Next, the game apparatus 10 adds the score gained in the course game that is finished this time to the cumulative score to update the cumulative score, and writes the cumulative score that is updated in the FIG. 40 (IC tag 50).

If the processing that writes the score gained this time into the FIG. 40 (IC tag 50) is ended, the destination decision screen 350 is displayed on the display 30. However, the placement screen 200 may be displayed along with the game result screen 300 or the destination decision screen 350.

In addition, if the FIG. 40 is not a figure of the kind that can be used in the game application concerned, it is notified that only the right kind of FIG. 40 can be used, and the score gained this time is not written in the IC tag 50 incorporated in the FIG. 40 that is placed. Furthermore, even if it is the right kind of FIG. 40, when differs from the registered FIG. 40, it is notified that the FIG. 40 concerned cannot be used unless registered, and the score gained this time is not written in IC tag 50 incorporated in the FIG. 40 that is placed.

Furthermore, the game apparatus 10 determines whether the cumulative score that is updated as described above reaches the score for raising the level (judgment score). When the updated cumulative score reaches the judgment score for raising the level, the level of the player character 152 is raised by a single rank. As describe later, if the level is raised, the number of transformable times is increased, and a probability table that is used at the time that the item outside course is acquired is changed. That is, according to the level of the player character 152, the number of transformable times and the probability table that is used are decided. If the probability table is changed, the kind of acquirable item outside course is increased. On the other hand, when the updated cumulative score does not reach the judgment score for raising the level, the level of the player character 152 is not changed.

In this embodiment, since the kind of acquirable item outside course is increased while the number of transformable times is increased when the level of the player character 152 is raised, it is possible to say that the degree of substantiality about the contents of the data of the probability table increases. Furthermore, since a result of the game processing (contents) executed by using the probability table that the contents is substantial is also affected (change arises), it is possible to say that the degree of substantiality about the contents of information processing such as a game processing increases.

Figure 7:
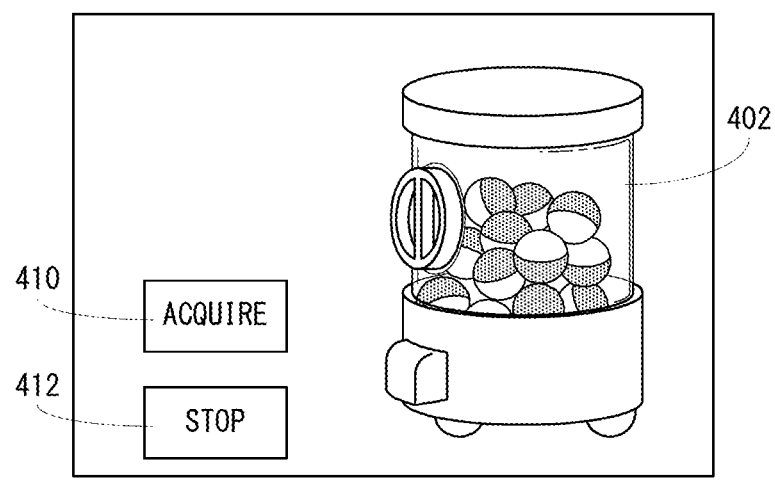
FIG. 7 is an illustration view showing a non-limiting example item acquisition screen that is displayed on the display in FIG. 1.

Furthermore, if the icon 104 is selected in the main menu screen 100, an item acquisition screen 400 as shown in FIG. 7 is displayed on the display 30. A machine object 402 is displayed in this item acquisition screen 400. This machine object 402 is a virtual vending machine that sells the item outside course. In addition, the item outside course is contained in a virtual capsule. Furthermore, an icon 410 and an icon 412 are displayed at the left of the machine object 402 in the item acquisition screen 400. The icon 410 is provided in order to instruct acquisition (purchase) of the item outside course. Furthermore, the icon 412 is provided in order to stop acquisition of the item outside course.

The FIG. 40 is also used when acquiring the item outside course. In this embodiment, if the icon 104 is selected in the main menu screen 100, the placement screen 200 shown in FIG. 5 is displayed on the display 30.

If the player places the FIG. 40 on the placement screen 200 (displaying surface of the display 30), the game apparatus 10 acquires the identification information from the FIG. 40 (IC tag 50). If the FIG. 40 is a figure that is of the kind usable in the game application concerned and is registered corresponding to the game application concerned, the item acquisition screen 400 is displayed on the display 30.

If the icon 410 is selected in this item acquisition screen 400, acquiring the item outside course is instructed, and the item outside course is selected according to a predetermined probability table, and an item outside course that is selected is acquired. At this time, an amount required for acquisition of the item outside course (input money) is subtracted from the possession money. If the item outside course is acquired, the screen returns to the main menu. A method that selects the item outside course will be described in detail later.

Furthermore, if the icon 412 is selected in the above-described item acquisition screen 400, acquiring the item outside course is canceled, and the screen returns to the main menu. Therefore, the possession money is not changed (decreased).

Furthermore, if the FIG. 40 that is placed on the placement screen 200 is not a figure of the kind usable in the game application concerned, virtual money is acquired, and the screen returns to the main menu while the item acquisition screen 400 is not displayed. Although the virtual money is acquired here, like the transformation processing and the score writing processing, it may be notified that only the right kind of the figure can be used. Furthermore, in place with the virtual money, other item inside course may be acquired.

Furthermore, if the figure differs from the FIG. 40 that is registered even if it is the right kind of FIG. 40, it is notified that if using own FIG. 40, the item outside course is acquirable, and the screen returns to the main menu. In this embodiment, the item acquisition screen 400 is displayed on the display 30 even when a figure is of the right kind but different from the FIG. 40 that is registered, and then, a virtual capsule is taken out from the virtual vending machine if the icon 410 is selected; however, a virtual letter that indicates a message that the item outside course can be acquired if own FIG. 40 is used is encased in the virtual capsule of this case. Also in this case, the possession money does not change.

As described above, the number of transformable times and the kind of item outside course that is acquirable are changed according to the level of the player character 152. The number of transformable times and the kind of item outside course that is acquirable increase as the level of the player character 152 is raised, for example. Furthermore, the level of the player character 152 is raised according to the cumulative value of the score (cumulative score) gained. These are decided according to a reference table shown in FIG. 8(A).

The judgment score, the number of transformable times and the probability table are described corresponding to the level of the player character 152 in the reference table.

The judgment score is a score used as a criterion of judgment on whether the level is to be raised. At the beginning of the game, the level of the player character 152 is "1", and if the cumulative score reaches 100,000 points, the level is raised to "2." Furthermore, if the cumulative score reaches 500,000 points, the level is raised to "3." That is, the level is raised by a single rank at a time. Furthermore, although illustration is omitted, the level can be raised to "4" or more according to the cumulative score.

The number of transformable times is the number of times that the player character 152 can be transformed into a transformation character in a day (from 0:00 a.m. up to 23:59:59) in the real world. In the reference table shown in FIG. 8(A), when the level of the player character 152 is "1", the number of transformable times is "1", as the level is raised a single rank, the number of transformable times increases by one (1) at a time. However, this is an example, and the number of transformable times may be decided in a time unit shorter than a day or by a unit of the number of the courses that are finished. Furthermore, the number of transformable times is raised by one (1) (predetermined number of times) as the level is raised by a single rank, but it does not need to be limited to this. The predetermined number of times may be two (2) times or more, for example. Furthermore, the number of transformable times may be decided in any number of times according to each level.

The probability table is a table for deciding (selecting) the item outside course to be acquired and probability tables that differ from each other are prepared for each level of the player character 152. In the example shown in FIG. 8(A), when the level is "1", a first probability table is used (referred to), when the level is "2", a second probability table is used, and when the level is "3", a third probability table is used. In the probability table, a probability that can acquire the special item outside course (special series) and the rare item outside course (rare series) is increased as the level of the player character 152 is raised.

However, distinction of the special series and the rare series is classification that a developer or designer of this game decided, and the probability that can acquire the special item outside course and the rare item outside course is set lower than that of the normal figure (basic series).

Furthermore, what is described in the reference table is a name or identification information of the probability table, and the probability table itself is stored in the flash memory 16 and read-out as necessary and stored in the RAM 14.

FIG. 8(B) is an illustration view showing an example of a second probability table. As described above, when the level of the player character 152 is "2", the second probability table is used as a probability table that decides the item outside course to be acquired. As shown in FIG. 8(B), a series selection probability, a kind and an item selection probability are described corresponding to classification of the item outside course in the second probability table. In a column of the classification, basic series, first rare series, second rare series, etc. are described. As the series selection probability, probabilities for selecting the classification of the basic series, first rare series, second rare series, etc. are described for each classification. As shown also in a column of the series selection probability, a probability that the first rare series is selected is lower than a probability that basic series is selected. Furthermore, a probability that the second rare series is selected is zero (0). That is, it is meant that when the level of the player character 152 is "2", the item outside course of the second rare series is not acquirable.

Furthermore, in a column of the kind, kinds of the item outside course (here, the name or identification information of the item) are described according to the classification for each series. Specifically, a first item, a second item, - - - , and an m-th item are described as the item outside course of the basic series. Furthermore, as the item outside course of the first rare series, a first item, a second item, - - - , and an n-th item are described. Furthermore, as the item outside course of the second rare series, a first item, a second item, - - - , and a p-th item are described.

In addition, the number of the items outside course included in each series may be the same, and may differ. Furthermore, although the same name (identification information) is used as the kind of the item outside course even in different series for convenience of explanation, these are items outside course of different kinds. Furthermore, as describe later, an image of each item outside course is produced by using image producing data 504b (see FIG. 9).

An item selection probability is a probability for selecting an item outside course within each series, probabilities of selecting respective items outside course included in the same series are set as the same.

In addition, although illustration is omitted, other probability tables are similarly constructed. For example, in a first probability table, a series selection probability of the basic series is set as 100/100, and a series selection probability of other series is set as 0/100. Furthermore, in a third probability table, for example, a series selection probability of the basic series is set as 50/100, a series selection probability of the first rare series is set as 40/100, a series selection probability of the second rare series is set as 10/100, and a series selection probability of other series is set as 0/100. If the special item outside course is added as a rare item outside course in a selectable manner, one (1) is added to a population parameter of the item selection probability corresponding to the added series. When a special item outside course is added to the first rare series, for example, a population parameter "n" of the item selection probability is changed to "n+1".

In addition, if a predetermined condition is satisfied, a special item outside course is added in a selectable manner. For example, a fact that the number of times that the player executes this game application exceeds the predetermined number of times, a fact that a time period that the player executes this game application exceeds a predetermined time period, or the like corresponds to the predetermined condition. Furthermore, a fact that a predetermined course is finished, a fact that a predetermined event occurs in a predetermined course or the like also corresponds to the predetermined condition. Furthermore, a fact that a unique item is acquired in the course game, or the like corresponds to the predetermined condition. These are all exemplification, and should not be limited.

The probability table to be used according to the level of the player character 152 is thus decided, and the kind of acquirable item outside course changes according to the probability table to be used.

If processing that acquires the item outside course (item acquisition processing, describe later) is executed, the probability table according to the level of the player character 152 is referred to (used), and the series is selected according to the series selection probability. Next, a single item outside course is selected according to the item selection probability from all of the items outside course classified into the selected series. Processing that a single item outside course is thus selected (drawn lots) according to the item selection probability in the selected series will be called normal selection processing.

However, when the item outside course selected this time is an item outside course that is already acquired, selection processing from only items outside course that are not yet acquired in the same series is executed by a predetermined probability (probability of 50 percent, for example).

In addition, when the item outside course that is not yet acquired does not exist, the item outside course that is previously selected is acquired as it is.

Furthermore, when the item outside course of the special series that can be selected is included in the rare series that is selected according to the series selection probability, it is drawn lots whether the processing that selects the item outside course from only the special series concerned or the normal selection processing is to be performed. In this embodiment, performing the processing that selects the item outside course from the special series is drawn lots by a predetermined probability (30 percent, for example).

If performing the processing that selects the item outside course only from the special series is not drawn lots, the normal selection processing is performed.

If performing the processing that selects the item outside course only from the special series is drawn lots, the item outside course is selected from the special series according to a predetermined probability. This predetermined probability is a reciprocal number of a total number of the items outside course of the special series that can be selected, and is set for each of these items outside course.

If the item outside course that is selected from the special series is not yet acquired, the item outside course concerned is selected. On the other hand, if the item outside course selected from the special series is an item that is already acquired, the normal selection processing is performed in the rare series including the special series concerned.

In addition, the above-described selection method of the item outside course is an example, and should not be limited. When the item outside course that is already acquired is selected, it is not necessary to redo selection.

Returning to FIG. 4(A), if the icon 106 is selected in the main menu screen 100, seeing a possession item is selected. If the icon 106 is selected, for example, all the items outside course acquired in the above-described manner are displayed in a state where those are arranged on a virtual display shelf, and a desired item outside course is taken out from the display shelf according to an operation by the player, and displayed with being expanded. Therefore, the player can see a desired item outside course.

Figure 9:
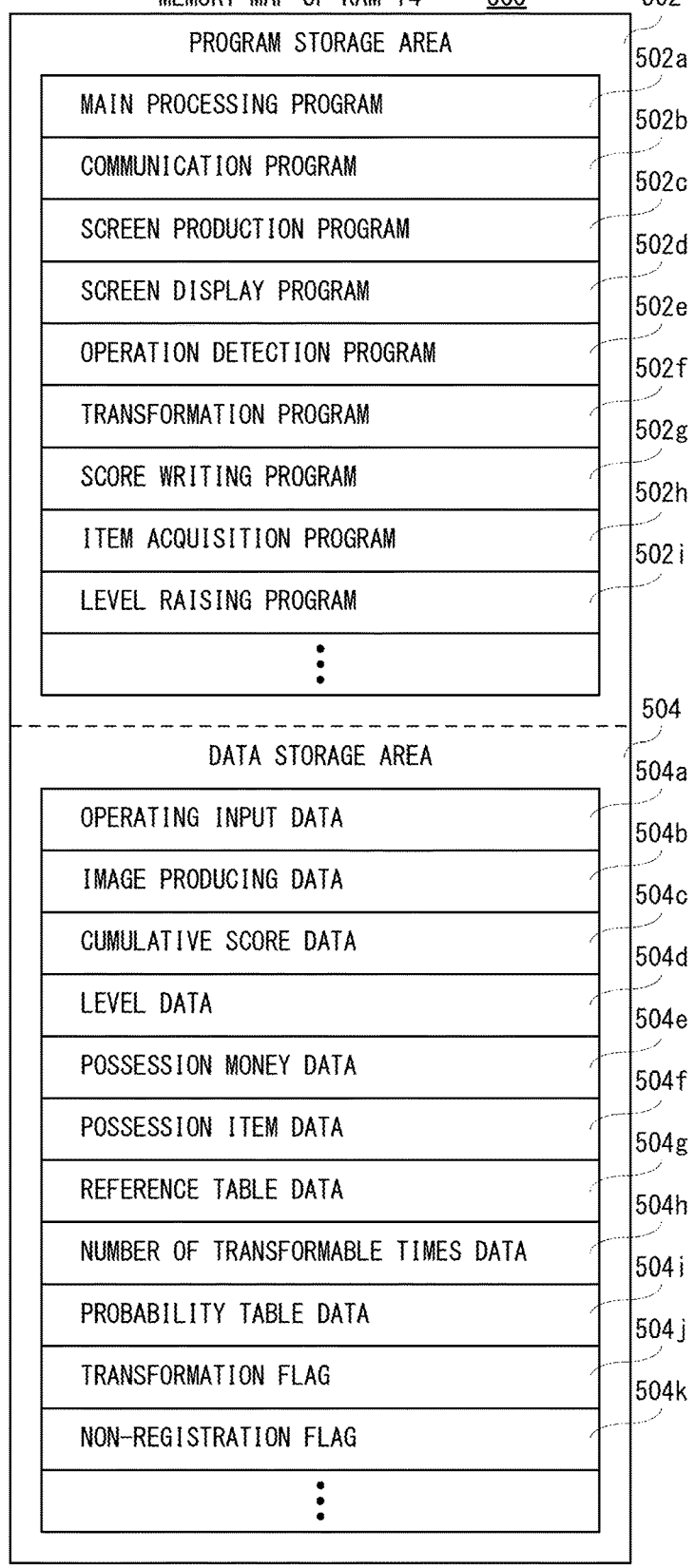
FIG. 9 is an illustration view showing a non-limiting example memory map of a RAM shown in FIG. 1.

FIG. 9 shows an example of a memory map 500 of the RAM 14 shown in FIG. 1. As shown in FIG. 9, the RAM 14 includes a program storage area 502 and a data storage area 504.

Some or all of programs and data that will be described in the following can be acquired from the flash memory 16 of the game apparatus 10, and also acquired from other computers or/and other game apparatuses 10 through communication, and further acquired from a card storage medium that is attached to the game apparatus 10.

The program storage area 502 stores an application program (information processing program) such as a game program. In this embodiment, the game program is constituted with a main processing program 502a, a communication program 502b, a screen production program 502c, a screen display program 502d, an operation detection program 502e, a transformation program 502f, a score writing program 502g, an item acquisition program 502h, a level raising program 502i, etc.

The main processing program 502a is a program for processing a main routine of a game of this embodiment. The communication program 502b is a program for performing wireless communication with other computers or/and other game apparatuses 10 by a wireless LAN. Furthermore, the communication program 502b is also a program for performing non-contact wireless communication with the IC tags 50.

The screen production program 502c is a program for producing image data corresponding to various screens (100, 150, 200, 300, 350, 400, etc.) by using image producing data 504b described later. The screen display program 502d is a program for outputting the image data produced according to the screen production program 502c to the display 30.

The operation detection program 502e is a program for detecting operation input data (504a) from the input device 26 (operating buttons and touch panel), and storing the operation input data into the data storage area 504 according to a time series.

The transformation program 502f is a program for transforming the player character 152 into a transformation character according to an operation by a player. The score writing program 502g is a program for writing, when a course is finished, the score gained in the course that is finished in the IC tag 50 incorporated in the FIG. 40 according to an operation by the player.

The item acquisition program 502h is a program for selecting and acquiring an item outside course according to operation of a player while using the probability table according to the level of the player character 152. The level raising program 502i is a program for raising the level of the player character 152 according to the reference table and the cumulative score.

Although illustration is omitted, the game program also includes a registration program, a sound output program, a backup program, etc. The registration program is a program for registering the FIG. 40 used in the game. The sound output program is a program for producing and outputting a sound required for the game. The backup program is a program for saving game data.

Furthermore, in the data storage area 504, the operation input data 504a, the image producing data 504b, cumulative score data 504c, level data 504d, possession money data 504e, possession item data 504f, reference table data 504g, number of transformable times data 504h and probability table data 504i are stored.

The operation input data 504a is operation input data from the input device 26 (operating buttons and touch panel), and stored according to a time series. The image producing data 504b is data of polygon data, texture data, etc. for producing image data, and as described above, also includes data for producing an item outside course. The data for producing each item outside course is stored in association with corresponding name (identification information) of each item outside course. The cumulative score data 504c is data of the cumulative score that is read from the IC tag 50 incorporated in the FIG. 40 when a course is finished, and the cumulative score is updated by adding the score gained through the course that is finished.

The level data 504d is numeral data indicative of a current level of the player character 152. The possession money data 504e is numeral data about a sum total of the virtual money that the player character 152 possesses. The possession item data 504f is data about the item inside course and the item outside course that the player character 152 possesses (acquires).

The reference table data 504g is data about the reference table as shown in FIG. 8(A). The number of transformable times data 504h is numeral data about the number of transformable times decided according to the level of the player character 152, and the number of transformable times is subtracted by one (1) at a time that the player character 152 is transformed into a transformation character. The probability table data 504i is data about the probability table that is decided to be used according to the level of the player character 152 and with referring to the reference table data 504g, and read from the flash memory 16.

Furthermore, a transformation flag 504j and a non-registration flag 504k are provided in the data storage area 504.

The transformation flag 504j is a flag for determining whether the player character 152 is in a state of a transformation character. In a state where the player character 152 is transformed into a transformation character, the transformation flag 504*j* is turned on, and the transformation flag 504*j* is turned off in a state where the player character 152 is not transformed into a transformation character.

Furthermore, the non-registration flag 504*k* is a flag for determining, when acquiring an item outside course, whether a FIG. 40 that is placed on the placement screen 200 is different from the FIG. 40 that is registered. When the FIG. 40 that is placed on the placement screen 200 is different from the FIG. 40 that is registered, the non-registration flag 504*k* is turned on, and when the FIG. 40 that is placed on the placement screen 200 is the same as the FIG. 40 that is registered, the non-registration flag 504*k* is turned off.

Although illustration is omitted, in the data storage area 504, other data required for execution of a game program are stored, other flags are provided, and counters (timers) are provided.

Figure 10:
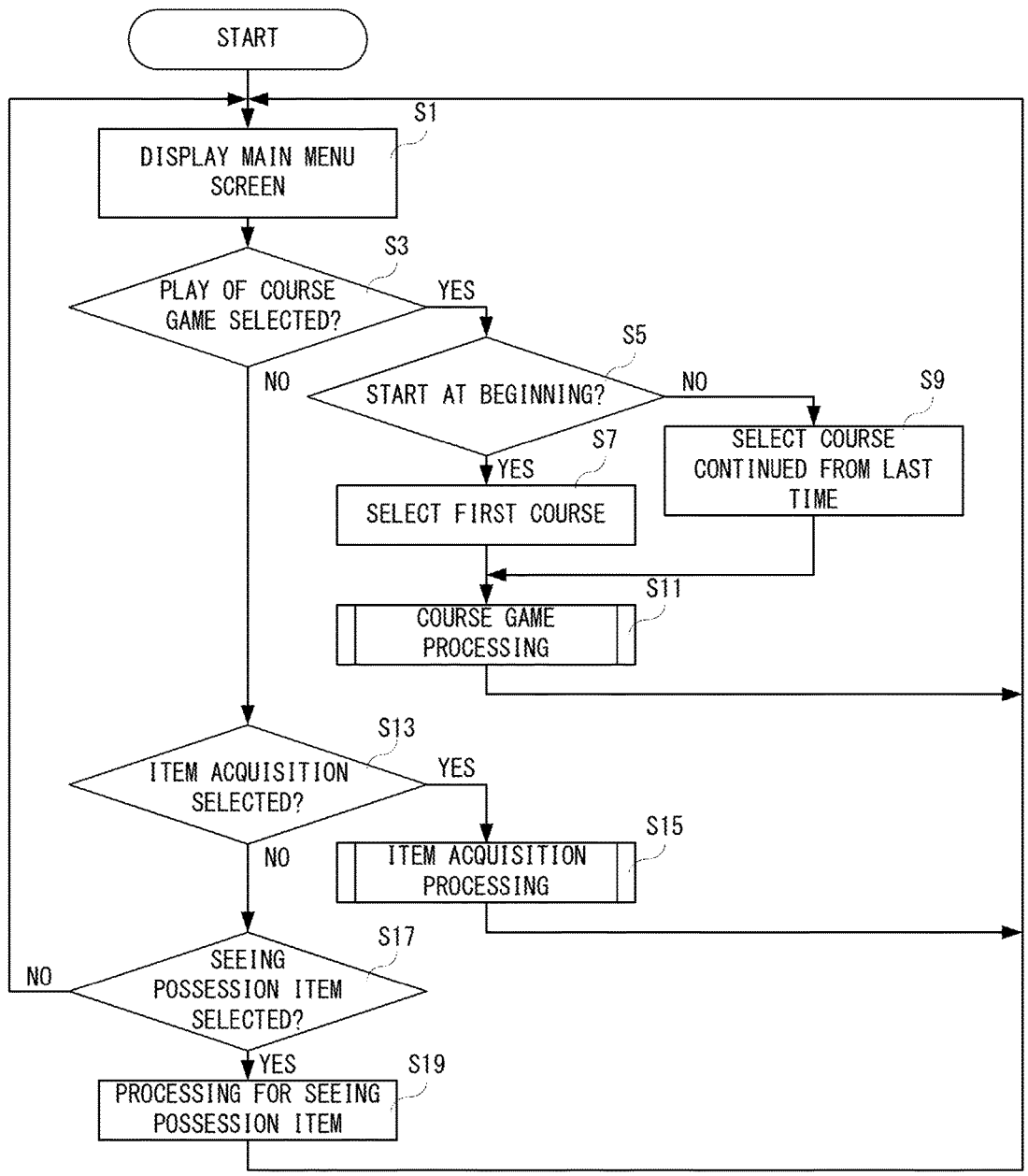
FIG. 10 is a flowchart showing non-limiting example whole processing by a CPU shown in FIG. 1.

FIG. 10 is a flowchart showing whole processing of the game of this embodiment, being executed by the CPU 12 of FIG. 1. As shown in FIG. 10, if the whole processing is started, the CPU 12 displays, in a step S1, the main menu screen 100 as shown in FIG. 4(A) on the display 30.

In addition, although illustration is omitted, when starting the whole processing, prior to displaying the main menu screen 100, the level (level data 504*d*) of the player character 152 is stored in the RAM 14 with referring to the save data stored in the flash memory 16, and the number of transformable times (number of transformable times data 504*h*) is stored in the RAM 14 according to the level concerned and with referring to the reference table data 504*g*. Furthermore, the transformation flag 504*j* is turned off at this time.

In a next step S3, it is determined whether play of a course game is selected. Here, the CPU 12 determines whether the icon 102 is selected (turned-on) in the main menu screen 100. More specifically, the CPU 12 detects the operation input data 504*a* so as to determine whether an instruction to select the icon 102 is input. This is true for a case where it is determined whether there is any instruction or selection by using the input device 26 in the following. However, in parallel with the whole processing, the CPU 12 executes detection processing of an operation input, and stores into the RAM 14 the operation input data 504*a* that is input from the input device 26.

If "NO" is determined in the step S3, that is, when the play of the course game is not selected, proceeding to a step S13. On the other hand, if "YES" is determined in the step S3, that is, when the play of the course game is selected, it is determined, in a step S5, whether the course game is to be started at the beginning. If "YES" is determined in the step S5, that is, when the course game is to be started at the beginning, in a step S7, a first course (1-1, for example) is selected, and then proceeding to a step S11. In the step S11, a course game processing (See FIG. 11) described later will be executed, and then returning to the step S1.

On the other hand, if "NO" is determined in the step S5, that is, when not starting the course game at the beginning, a course continued from the last time is selected in a step S9, and then proceeding to the step S11. In addition, at the time of the start of the game, the course continued from the last time is a course continued from a course that is stored in the save data, and is a course of a destination that is decided in the previous course game.

Although illustration and detailed description are omitted, if the game program is executed, before starting the whole processing, an initial screen is displayed on the display 30. In this initial screen, when the start of the game at the beginning is selected, "YES" is determined in the step S5, and when the start of the game continued from the last time is selected, "NO" is determined in the step S5. Furthermore, "NO" is determined in the step S5 also when the course game is finished and a next course (destination) is decided.

As described above, if "NO" is determined in the step S3, it is determined, in a step S13, acquiring an item is selected. Here, the CPU 12 determines whether the icon 104 is selected in the main menu screen 100. If "YES" is determined in the step S13, that is, when acquiring an item is selected, item acquisition processing (see FIG. 15 and FIG. 16) described later will be executed, and then returning to the step S1.

On the other hand, if "NO" is determined in the step S13, that is, when acquiring an item is not selected, it is determined, in a step S17, whether seeing a possession item is selected. Here, the CPU 12 determines whether the icon 106 is selected in the main menu screen 100. If "NO" is determined in the step S17, that is, if none of the icons 102-106 is selected, returning to the step S3. On the other hand, if "YES" is determined in the step S17, that is, if the icon 106 is selected, processing for seeing a possession item is executed in a step S19, and then returning to the step S1. Since the processing for seeing a possession item is as having described above, a duplicate description is omitted.

In addition, the save data is stored (overwritten) in the flash memory 16 at an arbitrary timing such as a timing to be returned to the main menu, a timing that there is a saving operation by the user, etc.

Furthermore, if a predetermined operating button is operated when the main menu screen 100 is displayed, an application menu screen for selecting an application in the game apparatus 10 is displayed, and the above-described game application is terminated.

Figure 11:
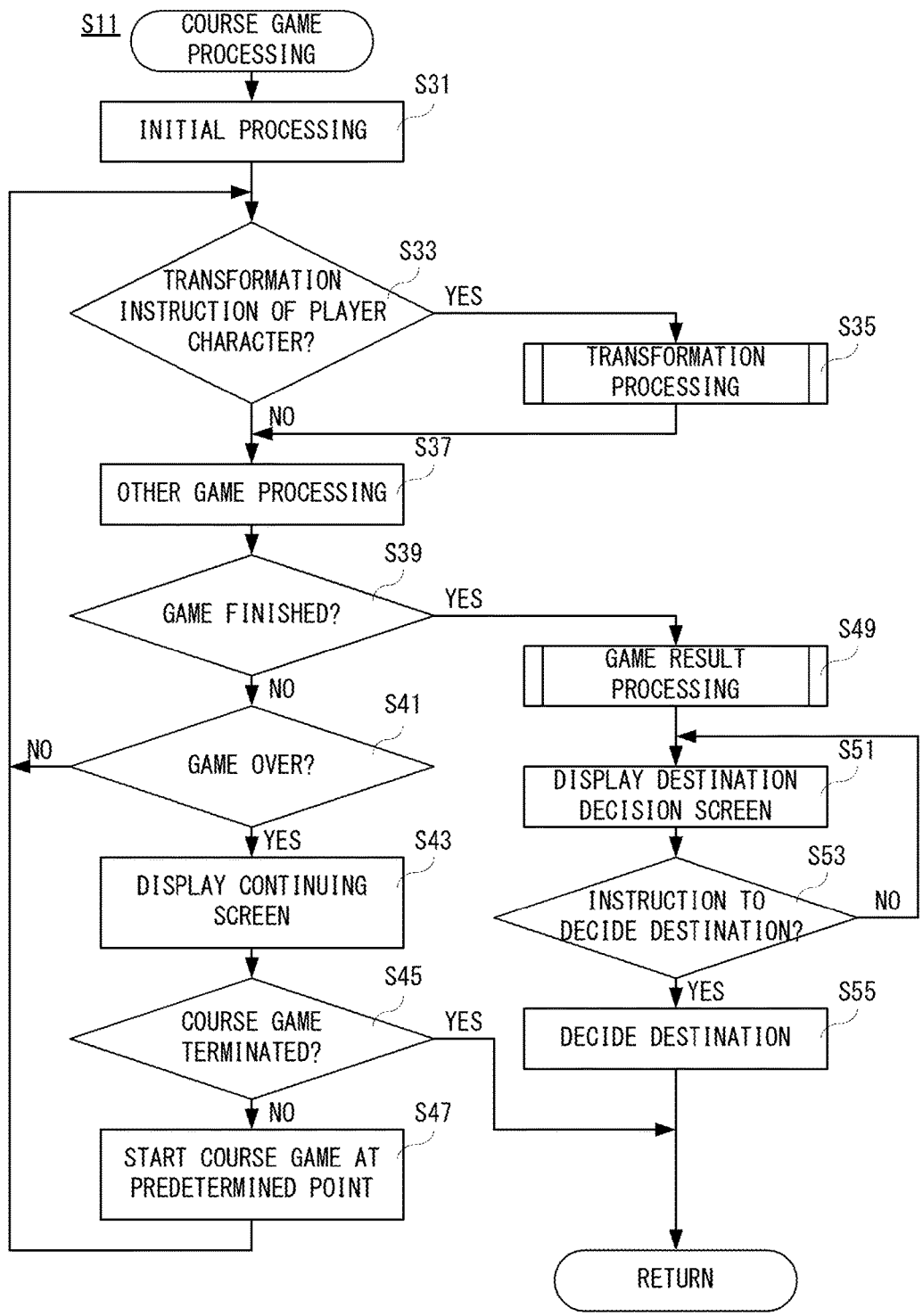
FIG. 11 is a flowchart showing non-limiting example course game processing by the CPU shown in FIG. 1.

FIG. 11 is a flowchart about course game processing in the step S11 shown in FIG. 10. As shown in FIG. 11, if the course game processing is started, the CPU 12 executes initial processing in a step S31. The initial processing includes processing that constructs a virtual game space for a course that is selected, processing that arranges respective characters and objects appearing in the game space at initial positions thereof, processing that sets initial values of various parameters to be used in the course game processing, etc.

In a subsequent step S33, it is determined whether there is any transformation instruction of the player character 152. Here, the CPU 12 determines whether the icon 170 is selected in the game screen 150. If "NO" is determined in the step S33, that is, if there is no transformation instruction of the player character 152, proceeding to a step S37. On the other hand, if "YES" is determined in the step S33, that is, if there is a transformation instruction of the player character 152, transformation processing (see FIG. 12) described later is executed in a step S35, and then proceeding to the step S37.

In addition, if there is a transformation instruction when the player character 152 is already transformed, proceeding to the step S37 without executing processing of the step S35. It is possible to determine whether the player character 152 is already transformed by determining whether the transformation flag 504*j* is turned on.

In the step S37, other game processing is executed. Here, the CPU 12 makes the player character 152 perform an arbitrary action according to the operation input data 504*a*, or makes the player character 152 fight with an enemy character according to the operation input data 504*a*. Furthermore, the CPU 12 moves a non-player character such as an enemy character, and changes a background image (background objects). In addition, the non-player character performs an arbitrary action such as movement irrespective of an operation by the player (operation input data 504*a*) according to processing by a computer (CPU 12). Then, the CPU 12 updates the game screen 150 (game image data) according to a result of the game processing.

Subsequently, in a step S39, it is determined whether the game is finished. If "NO" is determined in the step S39, that is, if the game is not finished, it is determined, in a step S41, whether it is game over. If "NO" is determined in the step S41, that is, if it is not game over, returning to the step S33. On the other hand, if "YES" is determined in the step S41, that is, if it is game over, a continuing screen is displayed on the display 30 in a step S43. Although illustration is omitted, the continuing screen is a screen for making the player select whether the course game about the course concerned is to be continued or to be terminated.

In a next step S45, it is determined whether the course game is to be terminated. If "YES" is determined in the step S45, that is, if the course game is to be terminated, the course game processing is ended, and then returning to the whole processing shown in FIG. 10. On the other hand, if "NO" is determined in the step S45, that is, if the course game is to be continued, the course game processing is started from a predetermined point in a step S47, and then returning to the step S33. The predetermined point is a start point of the course concerned or an intermediate point set in the course concerned, for example. Furthermore, whether the course game is to be started at the start point or the intermediate point can be decided according to a position of the player character 152 in the course concerned when the game is over, for example. However, the player may select.

Furthermore, if "YES" is determined in the step S39, that is, if the game is finished, game result processing (see FIG. 13 and FIG. 14) described later is executed in a step S49, and the destination decision screen 350 as shown in FIG. 6(B) is displayed on the display 30 in a step S51. Then, it is determined whether there is any instruction to decide a destination in a step S53. Here, the CPU 12 determines whether the icon 360 is selected. If "NO" is determined in the step S53, that is, if there is no instruction to decide a destination, returning to the step S51. On the other hand, if "YES" is determined in the step S53, that is, if there is an instruction to decide a destination, a course of the destination (next course) is decided in a step S55, and then returning to the whole processing. Since a decision method of a destination is as having described above, a duplicate description is omitted.

Figure 12:
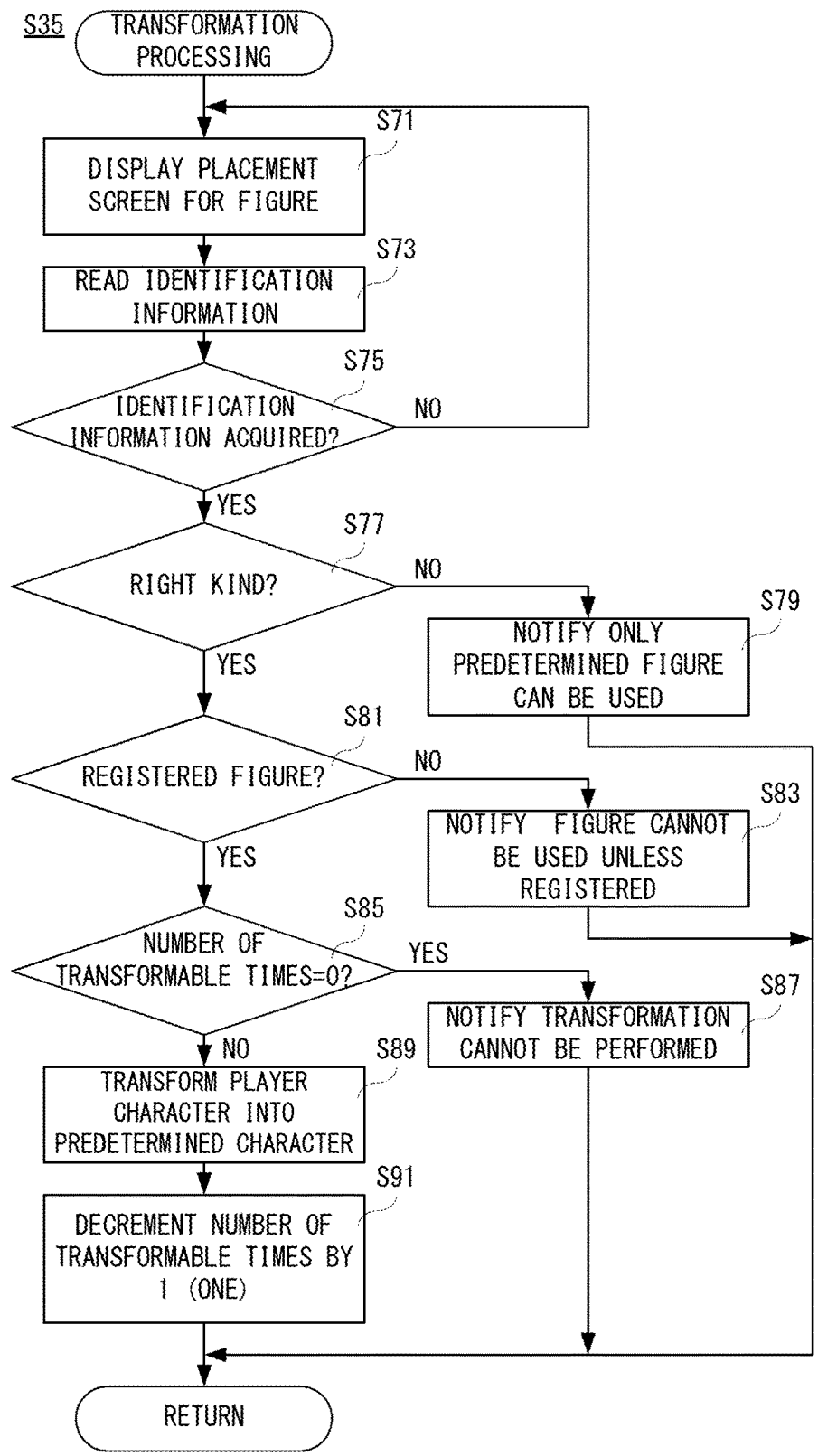
FIG. 12 is a flowchart showing non-limiting example transformation processing by the CPU shown in FIG. 1.

FIG. 12 is a flowchart about transformation processing in the step S35 shown in FIG. 11. As shown in FIG. 12, if the transformation processing is started, the CPU 12 displays the placement screen 200 for a figure as shown in FIG. 5 on the display 30 in a step S71. In a next step S73, the identification information is read. The CPU12 transmits a read instruction of the identification information via the non-contact communication module 22 and the antenna 24 so as to try to acquire of the data of the identification information that is stored in the EEPROM 54*b* of the IC tag 50 incorporated in the FIG. 40.

In a subsequent step S75, it is determined whether the identification information is acquired. If "NO" is determined in the step S75, that is, if the data of the identification information is not acquired, returning to the step S71. On the other hand, if "YES" is determined in the step S75, that is, if the data of the identification information that is acquired, it is determined whether it is of the right kind in a step S77. Here, the CPU 12 determines whether game information included in the identification information that is acquired shows the game application concerned.

If "NO" is determined in the step S77, that is, if not the right kind, it is notified, in a step S79, that a figure other than a predetermined figure (FIG. 40, in this embodiment) cannot be used, and the transformation processing is terminated, and then returning to the course game processing. On the other hand, if "YES" is determined in the step S77, that is, if it is the right kind, it is determined, in a step S81, whether a figure is the FIG. 40 that is registered. Here, the CPU 12 determines whether the individual information included in the identification information that is acquired previously corresponds to the individual information in association with the save data of the game concerned.

If "NO" is determined in the step S81, that is, if it is not the FIG. 40 that is registered, it is notified, in a step S83, that the FIG. 40 cannot be used unless registered, and then returning to the course game processing. Therefore, even if it is the right kind of FIG. 40, when the FIG. 40 that is not registered is used, the player character 152 cannot be transformed. Even if a player who does not possess the FIG. 40 borrows and uses the FIG. 40 that another player possesses, for example, since the FIG. 40 concerned is not registered corresponding to this game application, the player character 152 cannot be transformed.

On the other hand, if "YES" is determined in the step S81, that is, if it is the FIG. 40 that is registered, it is determined, in a step S85, whether the number of transformable times is zero (0). If "YES" is determined in the step S85, that is, if the number of transformable times is zero (0), it is notified, in a step S87, that the transformation cannot be performed, and then returning to the course game processing. The CPU 12 displays a message that the transformation cannot be performed, for example on the display 30 in the step S87. However, in place with displaying the message or together with the displaying the message, a sound (sound effect) indicating that the transformation cannot be performed is output from the speaker 34. In the following, this can be similarly applied to a case where other contents are to be notified.

On the other hand, if "NO" is determined in the step S85, that is, if the number of transformable times is one (1) or more, in a step S89, the player character 152 is transformed into a predetermined character (transformation character). At this time, the CPU 12 turns-on the transformation flag 504*j*. Then, the number of transformable times is subtracted by 1 (one) in a step S91, and then returning to the course game processing. In addition, in the step S91, the number of transformable times corresponding to the number of transformable times data 504*h* that is stored in the data storage area 504 of the RAM 14 is subtracted by 1 (one).

Thus, the player who possesses the FIG. 40 can transform the player character 152, thereby to make the game progress relatively easily if the FIG. 40 concerned is registered corresponding to the game. Therefore, it is possible to say that transforming the player character 152 into a transformation character assists the progress of the game processing.

In addition, the player character 152 returns to a state before transformation (original state) if a mistake occurs or the game is over after transformation into a transformation character. Otherwise, it may be considered that the player character does not return to a state before transformation (original state) even if a mistake occurs, and if the game is over, the player character returns to the state before transformation (original state). When returning to a state before transformation (original state), the transformation flag 504*j* is turned off. Such the processing is executed in the step S37 of the course game processing.

Furthermore, although the transformation processing is executed when the icon 170 is selected in this embodiment, the icon 170 may be prevented from being selected or it may be notified that the transformation cannot be performed at the time that the icon 170 is selected, when the number of transformable times is zero (0).

Figure 13:
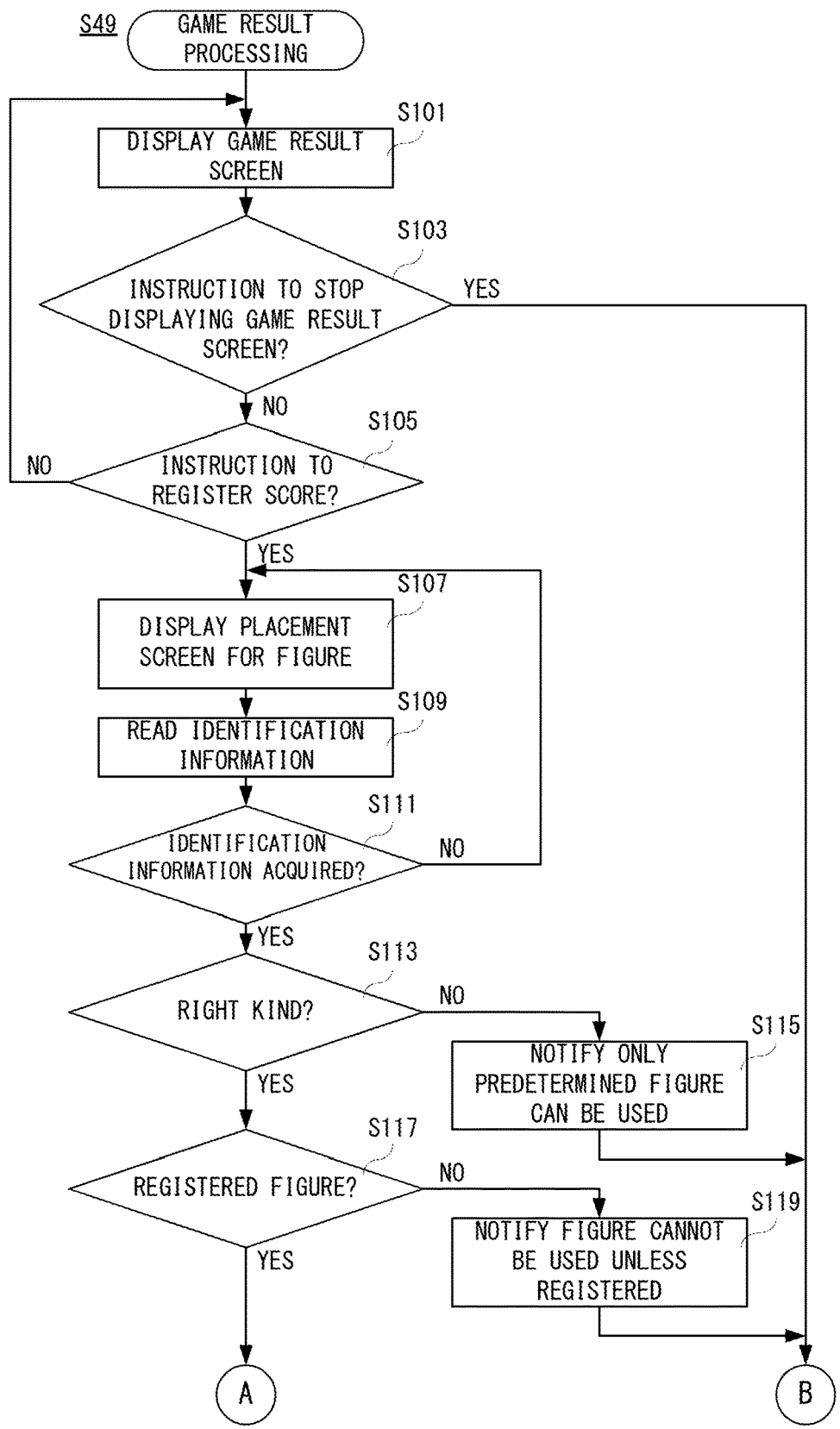
FIG. 13 is a flowchart showing a part of non-limiting example game result processing by the CPU shown in FIG. 1.
Figure 14:
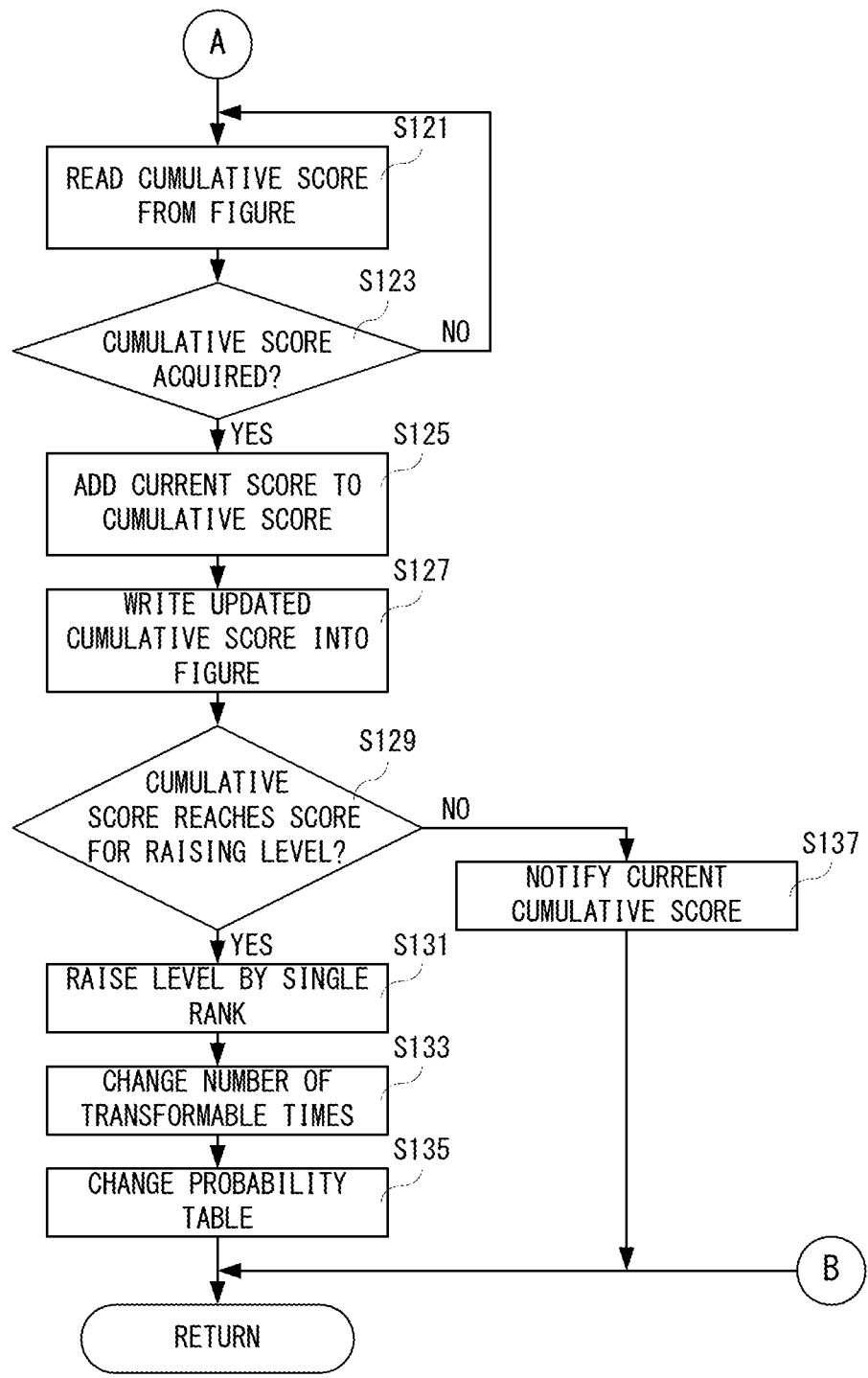
FIG. 14 shows another part of the non-limiting example game result processing by the CPU shown in FIG. 1, being a flowchart following FIG. 13.

FIG. 13 and FIG. 14 are flowcharts about game result processing of the step S49 shown in FIG. 11. In the following, although details of the game result processing will be described, the processing that is the same or similar to the processing that is already described will be described simply.

As shown in FIG. 13, if the game result processing is started, the CPU 12 displays the game result screen 300 as shown in FIG. 6(A) on the display 30 in a step S101. In a subsequent step S103, it is determined whether there is any instruction to stop displaying the game result screen 300. Here, the CPU 12 determines whether a predetermined operating button is operated (turned-on) in a state where the game result screen 300 is displayed.

If "YES" is determined in the step S103, that is, if there is an instruction to stop displaying the game result screen 300, as shown in FIG. 14, the game result processing is terminated, and then returning to the course game processing shown in FIG. 11. On the other hand, if "NO" is determined in the step S103, that is, if there is no instruction to stop displaying the game result screen 300, it is determined, in a step S105, whether there is any instruction to register a score. Here, the CPU 12 determines whether the icon 310 is selected.

If "NO" is determined in the step S105, that is, if there is no instruction to register a score, returning to the step S101. On the other hand, if "YES" is determined in the step S105, that is, if there is an instruction to register a score, the placement screen 200 as shown in FIG. 5 is displayed on the display 30 in a step S107, and the identification information is read in a step S109, and it is determined whether the identification information is acquired in a step S111. If "NO" is determined in the step S111, returning to the step S107. On the other hand, if "YES" is determined in the step S111, it is determined, in a step S113, whether it is the right kind.

If "NO" is determined in the step S113, it is notified, in a step S115, that a figure other than a predetermined FIG. 40 cannot be used, and then returning to the course game processing as shown in FIG. 14. On the other hand, if "YES" is determined in the step S113, it is determined, in a step S117, whether it is the FIG. 40 that is registered. If "NO" is determined in the step S117, it is notified, in a step S119, that the FIG. 40 cannot be used unless registered, and then returning to the course game processing.

On the other hand, if "YES" is determined in the step S117, as shown in FIG. 14, the cumulative score is read from the FIG. 40 in a step S121. Here, the CPU 12 transmits a read instruction of the cumulative score via the non-contact communication module 22 and the antenna 24.

In a next step S123, it is determined whether the cumulative score is acquired. If "NO" is determined in the step S123, that is, if the cumulative score is not acquired, returning to the step S121. On the other hand, if "YES" is determined in the step S123, that is, if the cumulative score is acquired, proceeding to a step S125. In addition, when the data of the cumulative score (cumulative score data 504c) that is transmitted from the FIG. 40 is acquired via the antenna 24 and the non-contact communication module 22, the CPU 12 stores the data to the data storage area 504.

In the step S125, the cumulative score is updated by adding a score gained this time to the cumulative score, and the cumulative score that is updated is written in the FIG. 40 in a step S127. In the step S127, the CPU 12 transmits an instruction to write the cumulative score via the non-contact communication module 22 and the antenna 24 together with the cumulative score data 504c. Therefore, the IC tag 50 incorporated in the FIG. 40 receives the write instruction and the cumulative score data 504c, and updates (overwrites) the data of the cumulative score stored in the EEPROM 54b.

Subsequently, in a step S129, it is determined whether the cumulative score reaches the score for raising the level. Here, the CPU 12 determines whether the cumulative score that is updated exceeds the judgment score that is described corresponding to a level higher than the current level by a single rank in the reference table. If "NO" is determined in the step S129, that is, if the cumulative score does not reach the score for raising the level, the current cumulative score is notified in a step S137, and then returning to the course game processing.

On the other hand, if "YES" is determined in the step S129, that is, if the cumulative score reaches the score for raising the level, the level of the player character 152 is raised by a single rank in a step S131, and the number of transformable times is changed in a step S133 according to the reference table, and the probability table is changed in a step S135 according to the reference table, and then returning to the course game processing. In addition, in the step S133, an increase (1 time, in this embodiment) of the number of transformable times is added to the number of transformable times indicated by the number of transformable times data 504h. Furthermore, in the step S135, the probability table data 504i according to the level that is raised is read from the flash memory 16 with referring to the reference table, and the probability table data 504i that is stored in the RAM 14 is updated.

Figure 15:
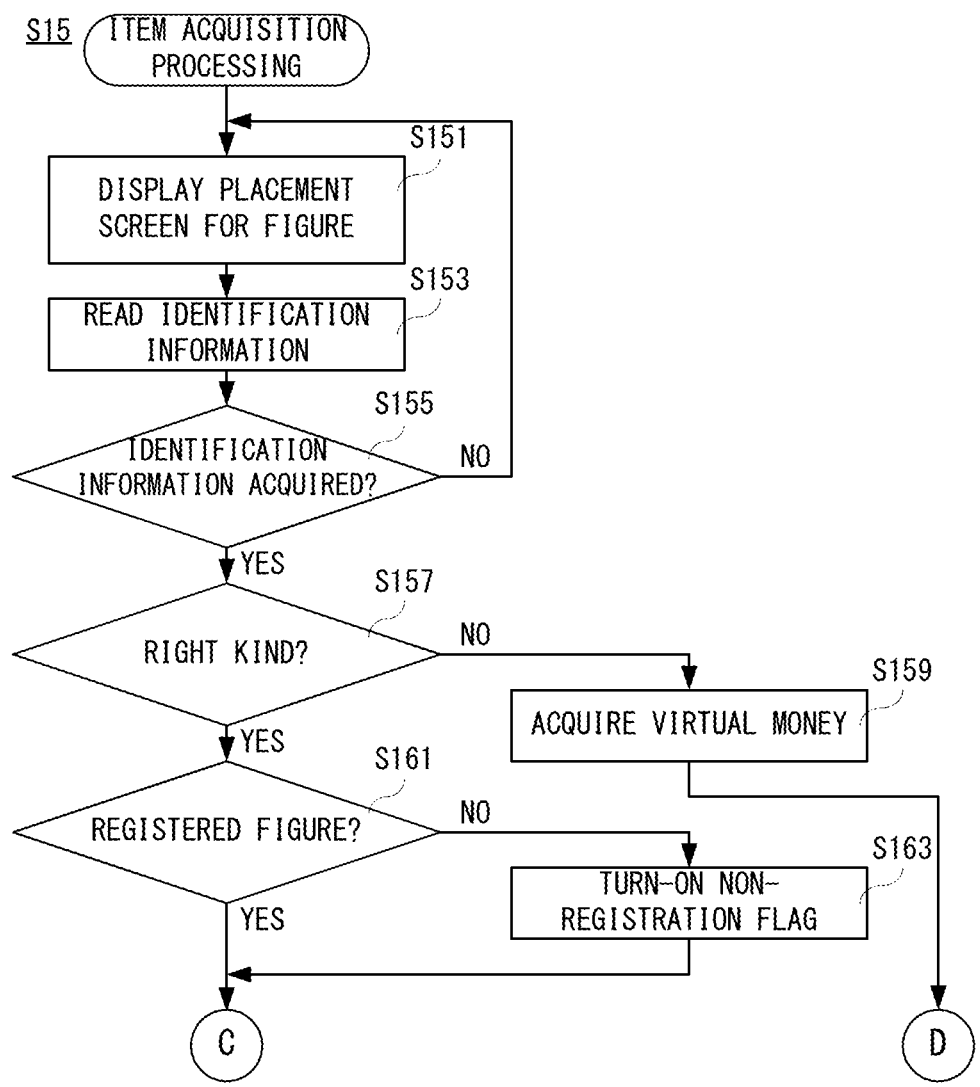
FIG. 15 is a flowchart showing a part of non-limiting example item acquisition processing by the CPU shown in FIG. 1.
Figure 16:
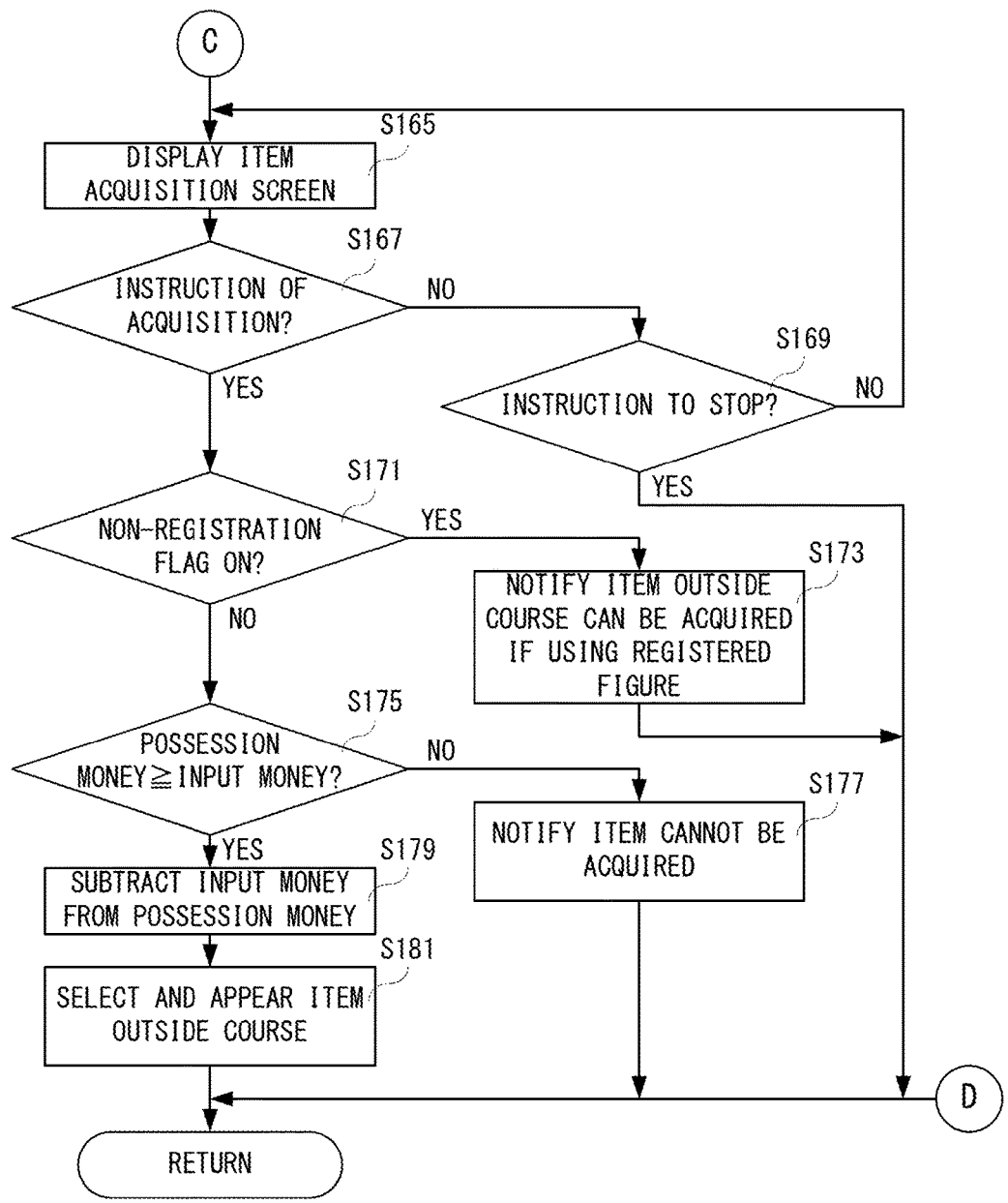
FIG. 16 shows another part of the non-limiting example item acquisition processing by the CPU shown in FIG. 1, being a flowchart following FIG. 15.

FIG. 15 and FIG. 16 are flowcharts about item acquisition processing shown in the step S15 of FIG. 10. In the following, although details of the item acquisition processing will be described, the processing that is the same or similar to the processing that is already described will be described simply.

As shown in FIG. 15, if the item acquisition processing is started, the CPU 12 displays the placement screen 200 for a figure as shown in FIG. 5 on the display 30 in a step S151. Although illustration is omitted, when the item acquisition processing is started, the non-registration flag 504k is turned off.

In a subsequent step S153, the identification information is read and it is determined, in a step S155, whether the identification information is acquired. If "NO" is determined in the step S155, returning to the step S151. On the other hand, if "YES" is determined in the step S155, it is determined, in a step S157, whether it is the right kind.

If "NO" is determined in the step S157, the virtual money is acquired in a step S159, and the item acquisition processing is terminated, and then returning to the whole processing. However, it is an example that the virtual money is acquired, and it does not need to be limited. Another item inside course may be acquired, or another item outside course may be acquired. Otherwise, as similar to the transformation processing and the game result processing, it may be notified that a figure other than the predetermined FIG. 40 cannot be used.

On the other hand, if "YES" is determined in the step S157, it is determined, in a step S161, whether it is the FIG. 40 that is registered. If "YES" is determined in the step S161, proceeding to a step S165 shown in FIG. 16. On the other hand, if "NO" is determined in the step S161, after the non-registration flag 504k is turned-on in a step S163, proceeding to the step S165. However, it may be notified, in a step S163, that the FIG. 40 cannot be used unless registered like the transformation processing and the game result processing. In such a case, the non-registration flag 504k is unnecessary.

As shown in FIG. 16, the item acquisition screen 400 as shown in FIG. 7 is displayed on the display 30 in the step S165. In a subsequent step S167, it is determined whether there is any instruction of acquisition. Here, the CPU 12 determines whether the icon 410 is selected. If "NO" is determined in the step S167, that is, if there is no instruction of acquisition, it is determined, in a step S169, whether there is any instruction to stop. Here, the CPU 12 determines whether the icon 412 is selected.

If "NO" is determined in the step S169, that is, if there is no instruction to stop, returning to the step S165. On the other hand, if "YES" is determined in the step S169, that is, if it is an instruction to stop, returning to the whole processing shown in FIG. 10.

Furthermore, if "YES" is determined in the step S167, that is, if there is an instruction of acquisition, it is determined, in a step S171, whether the non-registration flag 504k is turned-on. If "YES" is determined in the step S171, that is, if the non-registration flag 504k is turned-on, it is notified, in a step S173, that it is possible to acquire an item outside course if using the figure (own figure) that is registered, and then returning to the whole processing.

On the other hand, if "NO" is determined in the step S171, that is, if the non-registration flag 504k is turned-off, it is determined, in a step S175, whether the possession money is equal to or more than the amount of an input amount (required amount). If "NO" is determined in the step S175, that is, if the possession money is less than the input amount, it is notified, in a step S177, that an item is not acquirable, and then returning to the whole processing. On the other hand, if "YES" is determined in the step S175, that is, if the possession money is equal to or more than the input amount, the input amount is subtracted from the possession money in a step S179, and an item outside course is selected by using the probability table according to the current level and the item outside course that is selected is made to appear in a step S181, and then turning to the whole processing.

In the step S181, the CPU 12 decides the probability table to be used according to the level of the player character 152 with referring to the reference table data 504g, and reads the probability table (probability table data 504i) that is decided from the flash memory 16 and stores in the RAM14. Then, the CPU 12 selects the item outside course that the player character 152 acquires with using this probability table data 504i.

Furthermore, if processing of the step S181 is executed, the player character 152 acquires the item outside course that is made to appear, and the item outside course concerned is added to the possession item of the player character 152.

According to this embodiment, a predetermined figure is used, and a score gained in the course game is cumulated into the IC tag incorporated in the figure, and the game processing is executed while the data that is to be referred to is decided according to the cumulative score or the level based on the cumulative score concerned, and therefore, the game processing is changed according to the score, whereby the interest of the information processing using the figure can be increased.

Furthermore, according to this embodiment, since the score gained in the course game is cumulated, and the cumulative score is changed gradually, and therefore, the game processing is also changed gradually. Accordingly, it is possible to prevent the interest of the player from being declined as much as possible.

In addition, although a case where a virtual figure is acquired as an item outside course is described in this embodiment, it does not need to be limited to this. The virtual figure may be a figure of a game character other than the player character which appears in the course game or a figure of an animation character. Furthermore, an item outside course may be the same as an item inside course. Furthermore, in some cases, in place with acquiring an item outside course, a new course may be made to be playable.

Furthermore, in this embodiment, when the level of the player character is raised, the number of transformable times is increased and selectable item outside course are increased, but it does not need to be limited to this. When the player finishes the course, the number of transformable times may be increased or/and selectable item outside course may be increased.

Furthermore, although the IC tag is made to be incorporated in a predetermined figure in this embodiment, it may be incorporated in a predetermined card (IC card). In such a case, when transforming the player character, when writing a score in an IC tag, and when acquiring an item outside course, the game apparatus performs non-contact communication processing with the IC card in place with the figure.

Furthermore, in this embodiment, the game application is executed, and according to the cumulative score that cumulates the score gained in the course game, the number of transformable times is changed and the kind of acquirable item is changed so as to change the progress of the game, but it does not need to be limited to this. Also when an application other than the game application is executed, according to a score obtained with the application concerned or evaluation by having executed the application concerned, an item that can be used may be changed or a certain parameter may be changed, thereby to apply variation to the progress of the application concerned.

Furthermore, although a game apparatus is described as an example of an information processing apparatus in this embodiment, as far as it has a function to perform non-contact wireless communication with the IC tag that is incorporated in the figure, the embodiment can be applied to computers such as general-purpose PCs (personal computer), tablet PCs, workstations, feature phones, smartphones, etc.

Furthermore, although the CPU that is incorporated in the game apparatus is made to execute all the processing in this embodiment, it does not need to be limited to this. A system may be constructed such that a whole or part of the processing is executed by other apparatuses such as a server capable of performing communication with the game apparatus, and a plurality of apparatuses execute the processing jointly.

It should be noted that the specific numerical values described in the above-described embodiments are only examples, and to be set appropriately in accordance with the actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing apparatus, comprising:
wireless communication circuitry configured to perform non-contact communication with a storage medium; and
a processing system, including one or more computer hardware processors, the processing system being configured to execute instructions so as to at least provide:
an execution module configured to execute a game application;
a writing module configured to write a score according to an execution result of the game application that is executed by the execution module in the storage medium by using the wireless communication circuitry;
a reading module configured to read the score that is written in the storage medium from the storage medium by using the wireless communication circuitry; and
a decision module configured to decide predetermined data that is to be referred to during execution of the game application according to the score that is read from the storage medium by the reading module, wherein
the execution module is configured to execute the game application by referring to the predetermined data decided by the decision module;
processing that executes the game application by referring to the predetermined data is processing that assists progress of the game when executing the game application; and
the predetermined data that is to be referred to during execution of the game application according to the score includes a number of transformable times of an object in the game application and/or a probability table for defining probabilities for acquiring an item outside course in the game application.

2. The information processing apparatus according to claim 1, wherein the writing module is configured to cumulatively write the score according to the execution result of the game application in the storage medium, and
the decision module is configured to decide the predetermined data that is to be referred to according to a cumulative value of the score.

3. The information processing apparatus according to claim 1, wherein the predetermined data has a degree of substantiality of the contents that is increased as the score becomes high.

4. The information processing apparatus according to claim 1, wherein the execution module is configured to execute the game application by referring to the predetermined data according to a predetermined condition.

5. The information processing apparatus according to claim 1, wherein the processing of the game application by referring to the predetermined data differs dependent on an execution situation of the game application.

6. The information processing apparatus according to claim 1, wherein the reading module is configured to read the score from the storage medium at an arbitrary timing during execution of the game application.

7. The information processing apparatus according to claim 1, wherein the reading module is configured to read the score from the storage medium that is registered corresponding to the game application executed by the execution module.

8. An information processing system, comprising:
wireless communication circuitry configured to perform non-contact communication with a storage medium; and
a processing system, including one or more computer hardware processors for executing instructions such that the processing system is configured to at least:
execute a game application;
write a score, according to an execution result of the game application that is executed, in the storage medium by using the wireless communication circuitry;
read the score that is written in the storage medium from the storage medium by using the wireless communication circuitry; and
decide predetermined data that is to be referred to during execution of the game application according to the score that is read from the storage medium, wherein
the game application is executed by referring to the predetermined data that is decided;
processing that executes the game application by referring to the predetermined data is processing that assists progress of the game when executing the game application; and
the predetermined data that is to be referred to during execution of the game application according to the score includes a number of transformable times of an object in the game application and/or a probability table for defining probabilities for acquiring an item outside course in the game application.

9. A non-transitory storage medium storing an information processing program executable by a computer that comprises a communication apparatus performing non-contact communication with a memory, the information processing program causes the computer to provide functionality comprising:
an execution configured to execute a game application;
a writing configured to write a score according to an execution result of the game application that is executed by the execution in the memory by using wireless communication circuitry of the communication apparatus;
a reading configured to read the score that is written in the memory from the memory by using the wireless communication circuitry of the communication apparatus; and
a decision configured to decide predetermined data that is to be referred to during execution of the game application according to the score that is read from the memory by the reading, wherein
the execution is configured to execute the game application by referring to the predetermined data decided by the decision;
processing that executes the game application by referring to the predetermined data is processing that assists progress of the game when executing the game application; and
the predetermined data that is to be referred to during execution of the game application according to the score includes a number of transformable times of an object in the game application and/or a probability table for defining probabilities for acquiring an item outside course in the game application.

10. An information processing method of a computer that comprises a communication apparatus performing non-contact communication with a storage medium, comprising steps of:
- (a) executing a game application using a computer hardware processor;
- (b) writing a score according to an execution result of the game application that is executed in the step (a) in the storage medium by using wireless communication circuitry of the communication apparatus;
- (c) reading the score that is written in the storage medium from the storage medium by using the wireless communication circuitry of the communication apparatus; and
- (d) deciding predetermined data that is to be referred to during execution of the game application according to the score that is read from the storage medium in the step (c), wherein the step (a) executes the game application by referring to the predetermined data decided in the step (d);

processing that executes the game application by referring to the predetermined data is processing that assists progress of the game when executing the game application; and the predetermined data that is to be referred to during execution of the game application according to the score includes a number of transformable times of an object in the game application and/or a probability table for defining probabilities for acquiring an item outside course in the game application.

11. The information processing apparatus according to claim 1, wherein the number of transformable times is increased if the score exceeds a threshold.

12. The information processing apparatus according to claim 1, wherein the probability for an item outside course is increased if the score exceeds a threshold.

13. The information processing apparatus according to claim 1, further comprising a display which is configured to display a placement screen for placing the storage medium on the display for reading the data from the storage medium.

14. The information processing system according to claim 8, wherein the number of transformable times is increased if the score exceeds a threshold.

15. The information processing system according to claim 8, wherein the probability for an item outside course is increased if the score exceeds a threshold.

16. The information processing system according to claim 8, further comprising a display which is configured to display a placement screen for placing the storage medium on the display for reading the data from the storage medium.

17. The non-transitory storage medium according to claim 9, wherein the number of transformable times is increased if the score exceeds a threshold.

18. The non-transitory storage medium according to claim 9, wherein the probability for an item outside course is increased if the score exceeds a threshold.

19. The method according to claim 10, wherein the number of transformable times is increased if the score exceeds a threshold.

20. The method according to claim 10, wherein the probability for an item outside course is increased if the score exceeds a threshold.

* * * * *